(12) United States Patent
Liu et al.

(10) Patent No.: US 12,014,204 B2
(45) Date of Patent: Jun. 18, 2024

(54) BLOCK PROCESSING METHOD, NODE, AND SYSTEM

(71) Applicant: Tencent Technology (Shenzhen) Company Limited, Shenzhen (CN)

(72) Inventors: Pan Liu, Shenzhen (CN); Maocai Li, Shenzhen (CN); Zongyou Wang, Shenzhen (CN); Hu Lan, Shenzhen (CN); Yifang Shi, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 560 days.

(21) Appl. No.: 17/317,189

(22) Filed: May 11, 2021

(65) Prior Publication Data

US 2021/0263765 A1 Aug. 26, 2021

Related U.S. Application Data

(63) Continuation of application No. PCT/CN2020/086351, filed on Apr. 23, 2020.

(30) Foreign Application Priority Data

Apr. 26, 2019 (CN) .......................... 201910345985.4

(51) Int. Cl.
*G06F 9/46* (2006.01)
*G06F 9/54* (2006.01)
(Continued)

(52) U.S. Cl.
CPC .............. *G06F 9/463* (2013.01); *G06F 9/466* (2013.01); *G06F 9/546* (2013.01); *H04L 9/0643* (2013.01); *H04L 9/50* (2022.05)

(58) Field of Classification Search
None
See application file for complete search history.

(56) References Cited

U.S. PATENT DOCUMENTS

2017/0344987 A1* 11/2017 Davis ..................... G06Q 20/10
2018/0189755 A1    7/2018 Kilpatrick et al.
(Continued)

FOREIGN PATENT DOCUMENTS

CN        108389129 A       8/2018
CN        108876384 A      11/2018
(Continued)

OTHER PUBLICATIONS

Japanese Office Action with English Translation of Notice of Reasons for Refusal for Japanese Patent Application No. 2021-512837, drafting date Apr. 22, 2022, 9 pgs.
(Continued)

*Primary Examiner* — Charles E Anya
(74) *Attorney, Agent, or Firm* — Crowell & Moring LLP

(57) ABSTRACT

Embodiments of this disclosure disclose a block processing method, a node, and a system, to improve the speed of block generation and the performance of transaction processing. One method includes: a first node being a leader node, and a second node being a follower node, packaging, by the first node, first transaction information in a transaction queue of the first node into a candidate block, and broadcasting the candidate block through the blockchain; performing, by the first node, verification on the first transaction information in the candidate block to generate a first verification result, and executing the first transaction information in the candidate block to generate a first transaction execution result; broadcasting, by the first node, a first node processing result comprising the first verification result and the first transaction execution result through the blockchain; receiving, by the first node, a second node processing result broadcast by
(Continued)

the second node through the blockchain, the second node processing result comprising: a second verification result generated by the second node by performing verification on the first transaction information in the candidate block, and a second transaction execution result generated by executing the first transaction information in the candidate block by the second node; and performing, by the first node, consensus on the candidate block according to the first node processing result and the second node processing result, saving, by the first node, the candidate block in response to a consensus on the candidate block being reached successfully, and saving, by the first node, the first transaction execution result in response to the first transaction information being executed successfully.

20 Claims, 9 Drawing Sheets

(51) Int. Cl.
  *H04L 9/00* (2022.01)
  *H04L 9/06* (2006.01)

(56) References Cited

U.S. PATENT DOCUMENTS

| | | | |
|---|---|---|---|
| 2018/0240114 A1* | 8/2018 | Li | H04L 9/0637 |
| 2018/0276668 A1* | 9/2018 | Li | H04L 9/3239 |
| 2018/0341930 A1 | 11/2018 | Moir et al. | |
| 2018/0365686 A1* | 12/2018 | Kondo | H04L 9/3239 |

FOREIGN PATENT DOCUMENTS

| | | |
|---|---|---|
| CN | 109327459 | 2/2019 |
| CN | 109327459 A | 2/2019 |
| CN | 109542926 A | 3/2019 |
| CN | 109636389 A | 4/2019 |
| CN | 110046896 A | 7/2019 |
| JP | 2019-053713 A | 4/2019 |
| KR | 10-1924026 B1 | 11/2018 |
| WO | WO 2018/111295 A1 | 6/2018 |
| WO | WO 2018/119930 A1 | 7/2018 |
| WO | WO 2018/203382 A1 | 11/2018 |
| WO | WO 2018/222927 A1 | 12/2018 |
| WO | WO 2019/001139 A1 | 1/2019 |

OTHER PUBLICATIONS

International Search Report and Written Opinion with English Translation for International Application No. PCT/CN2020/086351 dated Jul. 23, 2020; 12 pages.
Office Action with English Translation of Concise Explanation of Relevance for Chinese Patent Application No. 201910345985.4 dated Mar. 18, 2021; 11 pages.
Korean Office Action for Korean Patent Application No. 10-2021-7009871 dated Jan. 16, 2023, 25 pages.
Singaporean Written Opinion for Singaporean Patent Application No. 11202101131Q dated Apr. 19, 2023, 7 pages.

* cited by examiner

BLOCK PROCESSING METHOD, NODE, AND SYSTEM

RELATED APPLICATION

This application is a continuation application of the International PCT Application No. PCT/CN2020/086351, filed with the China National Intellectual Property Administration, PRC on Apr. 23, 2020 which claims priority to Chinese Patent Application No. 201910345985.4, filed with the China National Intellectual Property Administration, PRC on Apr. 26, 2019, both of which are incorporated herein by reference in their entireties.

FIELD OF THE TECHNOLOGY

This application relates to the field of computer technologies, and in particular, to a block processing method, a node, and a system.

BACKGROUND OF THE DISCLOSURE

A user can initiate a transaction through a client, and all transaction information recorded during the transaction is packaged into a block for storage. With the continuous expansion of the transaction, blocks are linked to each other to form a blockchain, and the blockchain is also referred to as a ledger. The blockchain is an open network ledger, and the blockchain may include a plurality of blocks. There are multiple forms of blockchain including, for example, public chain, private chain, and alliance chain. The public chain may include a Bitcoin series, an Ethereum series, or the like.

Currently, there is a block generation method for the public chain, which may specifically include the following procedure:

After a new transaction arrives at a node (for example, a node 1) in the blockchain, the node 1 first verifies whether the transaction is valid, then adds the valid transaction in a local transaction pool, and broadcasts transaction information to other nodes in the blockchain.

After a new block generation cycle arrives, the node 1 obtains a transaction list from the transaction pool, then packages the transaction list as a candidate block, and after adding a signature to the candidate block, broadcasts the candidate block through the blockchain.

All nodes in the blockchain perform consensus on the received candidate block, and save the candidate block after a consensus is reached successfully, and finally, the transaction in the candidate block is executed by the node 1.

In a case that the foregoing block generation method is applied to the public chain, security of bottom layer data of the blockchain can be ensured. However, in the alliance chain and the private chain, verification of security factors may be divided into a plurality of layers, and is not limited to a bottom layer of the blockchain. In a case that the foregoing block generation method is applied to the alliance chain or the private chain, there is a problem that a time required for block generation may be too long, resulting in that transactions cannot be processed in time and lead to transactions accumulation. Consequently, a congestion problem of the blockchain is likely to occur.

SUMMARY

Embodiments of this disclosure provide a block processing method, a node, and a system, to improve the speed of block generation and the performance of transaction processing.

The embodiments of this disclosure provide the following solutions:

According to one aspect, an embodiment of this disclosure provides a block processing method, the method being executed by a first node in a blockchain, the blockchain further including a second node, the first node being a leader node, the second node being a follower node, and the method including:
  packaging, by the first node, first transaction information in a transaction queue of the first node into a candidate block, and broadcasting the candidate block through the blockchain;
  performing, by the first node, verification on the first transaction information in the candidate block to generate a first verification result, and executing the first transaction information in the candidate block to generate a first transaction execution result;
  broadcasting, by the first node, a first node processing result through the blockchain, the first node processing result including: the first verification result and the first transaction execution result;
  receiving, by the first node, a second node processing result broadcast by the second node through the blockchain, the second node processing result including: a second verification result generated by the second node by performing verification on the first transaction information in the candidate block, and a second transaction execution result generated by executing the first transaction information in the candidate block; and
  performing, by the first node, consensus on the candidate block according to the first node processing result and the second node processing result, then saving, by the first node, the candidate block if a consensus on the candidate block is reached successfully, and saving the first transaction execution result if the first transaction information is executed successfully.

According to one aspect, an embodiment of this disclosure provides a block processing method, the method being executed by a second node in a blockchain, the blockchain further including a first node, the first node being a leader node, the second node being a follower node, and the method including:
  receiving, by the second node, a candidate block broadcast by the first node through the blockchain, and obtaining first transaction information from the candidate block;
  performing, by the second node, verification on the first transaction information in the candidate block to generate a second verification result, and executing the first transaction information in the candidate block to generate a second transaction execution result;
  broadcasting, by the second node, a second node processing result through the blockchain, the second node processing result including: the second verification result and the second transaction execution result; and
  saving, by the second node, the candidate block if the first transaction information is verified successfully, and saving the second transaction execution result if the first transaction information is executed successfully.

According to one aspect, an embodiments of this disclosure provides a block processing method, the method being executed by a first node in a blockchain, the blockchain further including a second node, the first node being a leader node, the second node being a follower node, and the method including:
  putting, by the first node in response to at least one client transmitting transaction information to the blockchain, the transaction information transmitted by the client into a transaction queue of the first node;

checking, by the first node, whether the transaction queue meets a preset block generation condition;

packaging, by the first node in response to the transaction queue meeting the block generation condition, first transaction information in the transaction queue of the first node into a candidate block, adding a signature to the candidate block, and broadcasting the candidate block through the blockchain;

performing, by the first node, verification on the first transaction information in the candidate block to generate a first verification result, and executing the first transaction information in the candidate block to generate a first transaction execution result;

adding, by the first node, a signature to a first node processing result, and then broadcasting the first node processing result through the blockchain, the first node processing result including: the first verification result and the first transaction execution result;

receiving, by the first node, a second node processing result broadcast by the second node through the blockchain, the second node processing result including: a second verification result generated by the second node by performing verification on the first transaction information in the candidate block, and a second transaction execution result generated by executing the first transaction information in the candidate block; and performing, by the first node according to the first node processing result and the second node processing result, consensus on the candidate block by using a distributed consensus algorithm, then saving, by the first node, the candidate block if a consensus on the candidate block is reached successfully, and saving the first transaction execution result if the first transaction information is executed successfully.

According to one aspect, an embodiment of this disclosure provides a block processing method, the method being executed by a second node in a blockchain, the blockchain further including a first node, the first node being a leader node, the second node being a follower node, and the method including:

receiving, by the second node, a candidate block broadcast by the first node through the blockchain, and obtaining first transaction information from the candidate block;

performing, by the second node, verification on the first transaction information in the candidate block to generate a second verification result, and executing the first transaction information in the candidate block to generate a second transaction execution result;

adding, by the second node, a signature to a second node processing result, and then broadcasting the second node processing result through the blockchain, the second node processing result including: the second verification result and the second transaction execution result; and saving, by the second node, the candidate block if the first transaction information is verified successfully, and saving the second transaction execution result if the first transaction information is executed successfully.

According to one aspect, an embodiment of this disclosure further provides a blockchain node, the blockchain node being a first node in a blockchain, the blockchain further including a second node, the first node being a leader node, the second node being a follower node, and the first node including: a processing module and a transceiver module, the processing module being configured to package first transaction information in a transaction queue of the first node into a candidate block;

the transceiver module being configured to broadcast the candidate block through the blockchain;

the processing module being further configured to perform verification on the first transaction information in the candidate block to generate a first verification result, and execute the first transaction information in the candidate block to generate a first transaction execution result;

the transceiver module being further configured to broadcast a first node processing result through the blockchain, the first node processing result including: the first verification result and the first transaction execution result;

the transceiver module being further configured to receive a second node processing result broadcast by the second node through the blockchain, the second node processing result including: a second verification result generated by the second node by performing verification on the first transaction information in the candidate block, and a second transaction execution result generated by executing the first transaction information in the candidate block; and the processing module being further configured to perform consensus on the candidate block according to the first node processing result and the second node processing result, and then save, by the first node, the candidate block if a consensus on the candidate block is reached successfully, and save the first transaction execution result if the first transaction information is executed successfully.

According to one aspect, this embodiment of this disclosure further provide a blockchain node, the blockchain node being a second node in a blockchain, the blockchain further including a first node, the first node being a leader node, the second node being a follower node, and the second node including: a processing module and a transceiver module, the transceiver module being configured to receive a candidate block broadcast by the first node through the blockchain;

the processing module being configured to obtain first transaction information from the candidate block;

the processing module being further configured to perform verification on the first transaction information in the candidate block to generate a second verification result, and execute the first transaction information in the candidate block to generate a second transaction execution result;

the transceiver module being further configured to broadcast a second node processing result through the blockchain, the second node processing result including: the second verification result and the second transaction execution result; and the processing module being further configured to save the candidate block if the first transaction information is verified successfully, and save the second transaction execution result if the first transaction information is executed successfully.

According to one aspect, an embodiment of this disclosure further provides a blockchain node, the blockchain node being a first node in a blockchain, the blockchain further including a second node, the first node being a leader node, the second node being a follower node, and the first node including: a processing module and a transceiver module, the processing module being configured to put, in response to at least one client transmitting transaction information to the blockchain, the transaction information transmitted by the client into a transaction queue of the first node;

the processing module being configured to check whether the transaction queue meets a preset block generation condition;

the transceiver module being configured to package, in response to the transaction queue meeting the block generation condition, first transaction information in a transaction queue of the first node into a candidate block, add a signature to the candidate block, and broadcast the candidate block through the blockchain;

the processing module being configured to perform verification on the first transaction information in the candidate block to generate a first verification result, and execute the first transaction information in the candidate block to generate a first transaction execution result;

the transceiver module being configured to add a signature to a first node processing result, and then broadcast the first node processing result through the blockchain, the first node processing result including: the first verification result and the first transaction execution result;

the transceiver module being configured to receive a second node processing result broadcast by the second node through the blockchain, the second node processing result including: a second verification result generated by the second node by performing verification on the first transaction information in the candidate block, and a second transaction execution result generated by executing the first transaction information in the candidate block; and the processing module being configured to perform, according to the first node processing result and the second node processing result, consensus on the candidate block by using a distributed consensus algorithm, and then save the candidate block if a consensus on the candidate block is reached successfully, and save the first transaction execution result if the first transaction information is executed successfully.

According to one aspect, this embodiment of this disclosure further provide a blockchain node, the blockchain node being a second node in a blockchain, the blockchain further including a first node, the first node being a leader node, the second node being a follower node, and the second node including: a processing module and a transceiver module, the transceiver module being configured to receive a candidate block broadcast by the first node through the blockchain, and obtain first transaction information from the candidate block;

the processing module being configured to perform verification on the first transaction information in the candidate block to generate a second verification result, and execute the first transaction information in the candidate block to generate a second transaction execution result;

the transceiver module being configured to add a signature a second node processing result, and then broadcast the second node processing result through the blockchain, the second node processing result including: the second verification result and the second transaction execution result; and the processing module being configured to save the candidate block if the first transaction information is verified successfully, and save the second transaction execution result if the first transaction information is executed successfully.

According to an aspect, an embodiment of this disclosure provides a blockchain node, the blockchain node being a first node in a blockchain, the first node including: a processor and a memory, the memory being configured to store instructions; and the processor being configured to execute the instructions in the memory, causing the first node to perform the block processing method on a first node side.

According to an aspect, this embodiment of this disclosure provides a blockchain node, the blockchain node being a second node in a blockchain, the second node including: a processor and a memory, the memory being configured to store instructions; and the processor being configured to execute the instructions in the memory, causing the second node to perform the block processing method on second node side.

According to an aspect, an embodiment of this disclosure provides a block processing system, the block processing system including: a first node and a second node,
the first node being configured to perform the block processing method on a first node side; and
the second node being configured to perform the block processing method on a second node side.

According to an aspect, an embodiment of this disclosure provides a computer-readable storage medium, the computer-readable storage medium storing instructions, when run on a computer, causing the computer to perform the method according to the foregoing aspects.

According to an aspect, an embodiment of this disclosure provides a computer program product, when run on a computer, causing the computer to perform the foregoing method.

In the embodiments of this disclosure, if a first node is a leader node, and a second node is a follower node, the first node packages first transaction information in a transaction queue of the first node into a candidate block, and broadcasts the candidate block through the blockchain. Then the first node performs verification on the first transaction information in the candidate block to generate a first verification result, and executes the first transaction information in the candidate block to generate a first transaction execution result. The first node broadcasts a first node processing result through the blockchain, the first node processing result including: the first verification result and the first transaction execution result. The first node receives a second node processing result broadcast by the second node through the blockchain. The first node performs consensus on the candidate block according to the first node processing result and the second node processing result. Then the first node saves the candidate block if a consensus on the candidate block is reached successfully, and saves the first transaction execution result if the first transaction information is executed successfully. In the embodiments of this disclosure, the first node serves as the leader node. The first node may cache to-be-processed transaction information by using the transaction queue, and package the transaction information in the transaction queue into the candidate block, so that the candidate block can be broadcast, and the follower node in the blockchain can perform transaction verification and transaction execution. After broadcasting the candidate block, the first node can perform the following processing: transaction verification and transaction execution. Then the first node can broadcast the first node processing result. The first node performs consensus on the candidate block according to a processing result of each node in the blockchain, and saves the block when a consensus is reached successfully. In the embodiments of this disclosure, the order of block generation is changed, so that all nodes in the blockchain can perform transaction verification and transaction execution, and therefore, the speed of block generation and the performance of transaction processing can be improved.

BRIEF DESCRIPTION OF THE DRAWINGS

To describe the technical solutions of embodiments of this disclosure more clearly, the following briefly describes the accompanying drawings required for describing the embodiments. Apparently, the accompanying drawings in the following description show only some embodiments of this disclosure, and a person of ordinary skill in the art may still derive other accompanying drawings according to these accompanying drawings without creative efforts.

DESCRIPTION OF EMBODIMENTS

Embodiments of this disclosure provide a block processing method, a node, and a system, to improve the speed of block generation and the performance of transaction processing.

To make the objectives, features, and advantages of the embodiments of this disclosure clearer and more comprehensible, the following clearly and completely describes the technical solutions in the embodiments of this disclosure with reference to the accompanying drawings in the embodiments of this disclosure. Apparently, the embodiments described are merely some rather than all of the embodiments of this disclosure. All other embodiments obtained by a person skilled in the art based on the embodiments of this disclosure shall fall within the protection scope of this application.

In the specification, claims, and accompanying drawings of the embodiments of this disclosure, the terms "include", "contain", and any other variants are intended to cover a non-exclusive inclusion. Therefore, a process, method, system, product, or device that includes a series of units is not necessarily limited to those units, but may include other units not specified expressly, or inherent to such units of the process, method, product, or device. In this disclosure, a unit and a module may be hardware such as a combination of electronic circuitries; firmware; or software such as computer instructions. The unit and the module may also be any combination of hardware, firmware, and software. In some implementation, a unit may include at least one module. Each unit or module can be implemented using one or more processors (or processors and memory). Likewise, a processor (or processors and memory) can be used to implement one or more units or modules. Moreover, each unit or module can be part of an overall unit or module that includes the functionalities of the unit or module.

First, a blockchain system described in the embodiments of this disclosure is briefly introduced.

Figure 1:
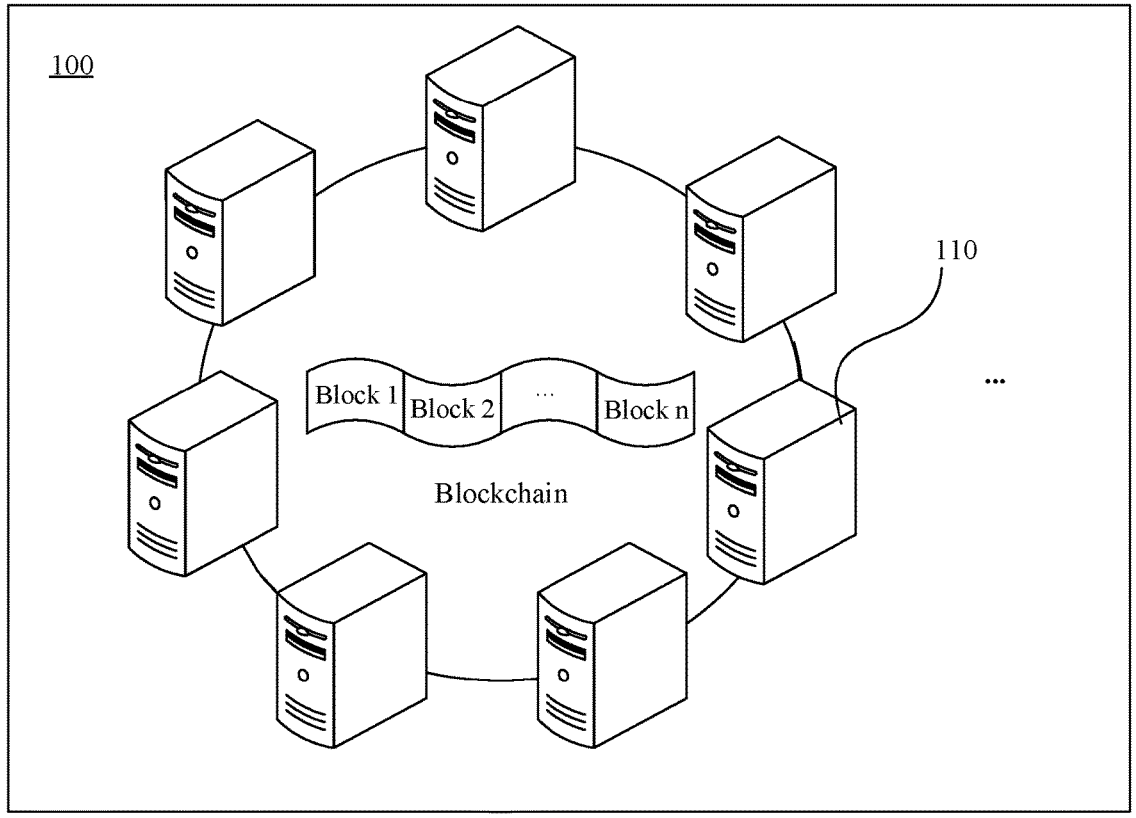
FIG. 1 is a schematic diagram of an exemplary blockchain system according to an embodiment of this disclosure.

Blockchain system is a data sharing system, that is, a system used for sharing data between nodes. FIG. 1 is a schematic diagram of a blockchain system 100 according to an embodiment of this disclosure. The blockchain system 100 may include a plurality of nodes 110 (also referred to as "blockchain nodes"). Each node 110 may receive input information during normal operation, and maintain shared data in the blockchain system 100 based on the received input information. To ensure information exchange in the blockchain system 100, the nodes 110 in the blockchain system 100 may have direct or indirect information connections, and the nodes 110 may perform information transmission through the information connections. For example, when any node in the blockchain system 100 receives the input information, other nodes in the blockchain system 100 obtain the input information according to a consensus algorithm, and store the input information as data in shared data, to make data stored on all nodes in the blockchain system 100 consistent.

The nodes 110 in the blockchain system 100 all have corresponding node identifiers, and the nodes 110 in the blockchain system 100 may all store node identifiers of other nodes in the blockchain system 100, to subsequently broadcast a generated block to the other nodes in the blockchain system according to the node identifiers of the other nodes. Each node may maintain a node identifier list shown in the following table, and store node names and node identifiers correspondingly in the node identifier list. A node identifier may be an Internet Protocol (IP) address or any other type of information capable of identifying the node. IP addresses in Table 1 are only used as an example for description.

TABLE 1

| Node name | Node identifier |
| --- | --- |
| Node 1 | 117.114.151.174 |
| Node 2 | 117.116.189.145 |
| ... | ... |
| Node N | 119.123.789.258 |

Figure 2:
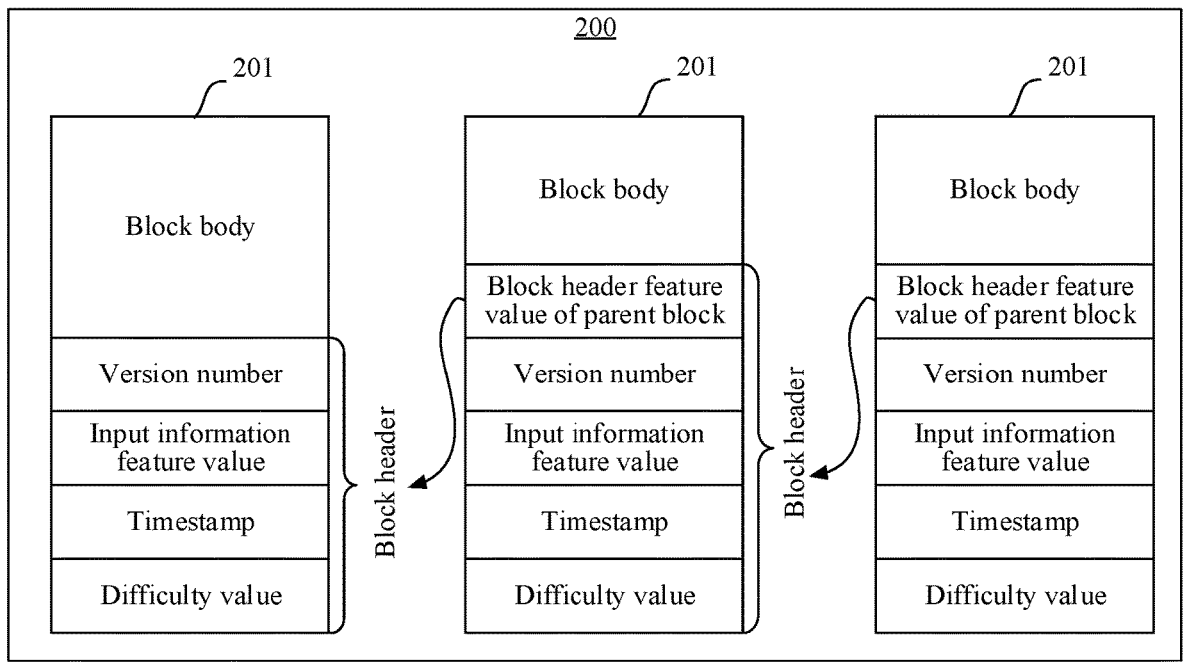
FIG. 2 is a schematic structural diagram of an exemplary block according to an embodiment of this disclosure.

The nodes 110 in the blockchain system 100 store an identical blockchain. The blockchain includes a plurality of blocks. Referring to FIG. 2, a blockchain 200 includes a plurality of blocks 201. A founding block includes a block header and a block body. The block header stores an input information feature value, a version number, a timestamp, and a difficulty value, and the block body stores input information. A next block of the founding block uses the founding block as a parent block, and the next block also includes a block header and a block body. The block header stores an input information feature value of a current block, a block header feature value of the parent block, a version number, a timestamp, and a difficulty value. By analogy, block data stored in each block in the blockchain is associated with block data stored in the parent block, thereby ensuring the security of the input information in the blocks.

FIG. 2 is an optional schematic diagram of a block structure according to an embodiment of this disclosure. Referring to FIG. 2, when the blocks 201 in the blockchain 200 are generated, after receiving input information, performing verification on the input information, and completing the verification, a node where the blockchain is located stores the input information in a memory pool, and updates a hash tree that is used for recording the input information. Subsequently, an update timestamp is updated into a time at which the input information is received, and different nonces (number only used once) are tried to calculate the feature value a plurality of times, so that the calculated feature value can meet the following formula:

$$SHA256(SHA256(version+prev\_hash+merkle\_root+ntime+nbits+x)) < TARGET$$

where SHA256 is a feature value algorithm used for calculating the feature value; version (version number) is version information of a relevant block protocol in the blockchain; prev_hash is the block header feature value of the parent block of the current block; merkle_root is the feature value of the input information; ntime is the update time at which the timestamp is updated; nbits is the current difficulty, which has a fixed value within a period of time and is determined again after a fixed period of time expires; x is a nonce; and TARGET is a feature value threshold, where the feature value threshold may be determined according to nbits.

In this way, when the nonce that meets the foregoing formula is calculated, information can be correspondingly stored, so that the block header and the block body are generated to obtain a current block. Subsequently, the node where the blockchain is located transmits, according to node identifiers of other nodes in the blockchain system, a newly generated block separately to the other nodes in the blockchain system where the node is located. The other nodes perform verification on the newly generated block, and after completing the verification, add the newly generated block into the blockchain that the other nodes store.

Figure 3:
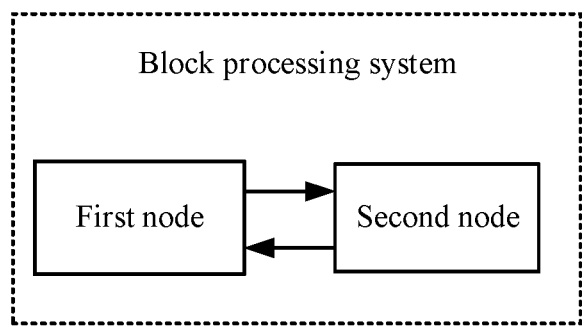
FIG. 3 is a schematic structural diagram of composition of an exemplary block processing system according to an embodiment of this disclosure.

The block processing method provided in the embodiments of this disclosure may be applied to the block processing system, and the block processing system is a part of the blockchain. As shown in FIG. 3, the block processing system may include at least two blockchain nodes. For example, a first node and a second node may be included. The first node is a leader node, and the second node is a follower node. The first node and the second node may communicate with each other, for example, through a wireless network or a wired network. Specifically, in the block processing system, the leader node and the follower node may be determined through a node role selection process. For example, the Raft algorithm may be run among all the nodes of the blockchain to elect a leader node and a follower node. There is only one leader node in the blockchain, but there may be one or more follower nodes in the blockchain. The Raft algorithm is a distributed consensus algorithm ensuring that a plurality of nodes achieve a consensus in state. During normal operation, a node either plays a leader's role or plays a follower's role to follow the leader. The algorithm used for the node role selection in the embodiments of this disclosure is not limited to the Raft algorithm. For example, a byzantine fault tolerance (BFT) like algorithm, such as a practical byzantine fault tolerance (PBFT) algorithm, may alternatively be used for the node role selection, which is not limited herein.

Figure 4:
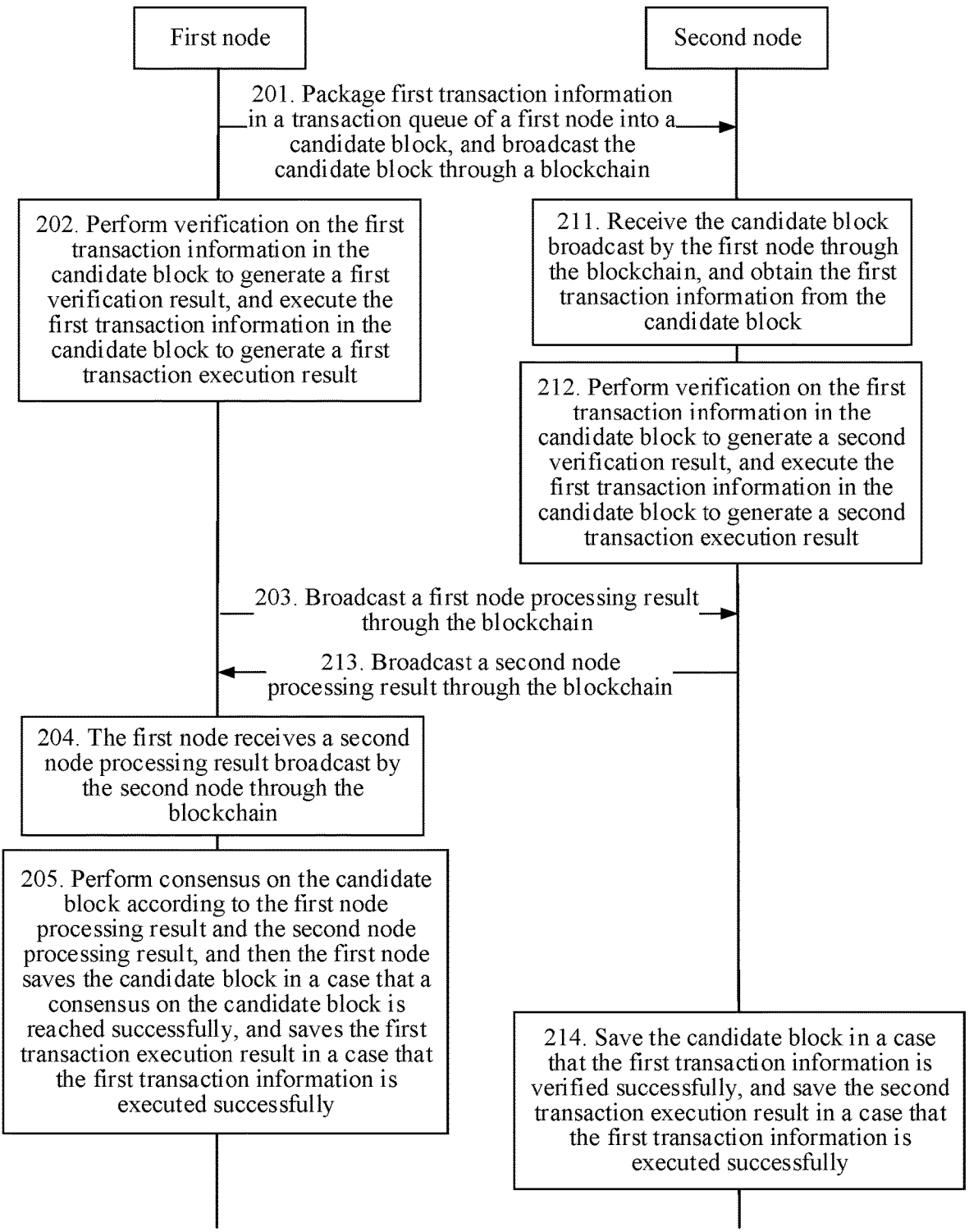
FIG. 4 is a schematic flowchart of interaction between a leader node and a follower node according to an embodiment of this disclosure.

First, an interaction procedure between the leader node and the follower node in the block processing system in the embodiments of this disclosure is described by using an example. Referring to FIG. 4, the block processing method provided in one of the embodiments of this disclosure may include the following steps.

201. In a case that a first node is a leader node, and a second node is a follower node, the first node packages first transaction information in a transaction queue of the first node into a candidate block, and broadcasts the candidate block through a blockchain.

In this embodiment of this disclosure, one leader node and at least one follower node may be determined through the node role selection process in the blockchain. For example, the first node is the leader node, and the second node is the follower node. When the first node is elected as the leader node, the first node can manage a transaction queue, where the transaction queue is used for storing transaction information transmitted by a client. There may be one or more pieces of transaction information stored in the transaction queue, and the transaction information may also be referred to as a transaction.

For example, the first node packages the first transaction information in the transaction queue of the first node into the candidate block, where the candidate block is a block to be written to a blockchain ledger. When the first transaction information is packaged into the candidate block, the first node may broadcast the candidate block through the blockchain, and when the first node broadcasts the candidate block, all nodes in the blockchain (including the follower node and the leader node) may receive the candidate block. It is not limited that, in this embodiment of this disclosure, before broadcasting, the first node may alternatively add a signature to the candidate block or the first transaction information to prevent the information that is broadcast from being tampered with.

211. The second node receives the candidate block broadcast by the first node through the blockchain, and obtains the first transaction information from the candidate block.

In this embodiment of this disclosure, when the first node broadcasts the candidate block through the blockchain, the second node in the blockchain may receive the candidate block broadcast by the first node through the blockchain. It is not limited that, another follower node in the blockchain may also receive the candidate block. For example, a third node in the blockchain may also receive the candidate block transmitted by the first node. In subsequent embodiments, an example in which the second node processes the candidate block and the transaction information is used. Another follower node in the blockchain can also refer to the execution procedure of the second node, which is not limited herein.

After the second node obtains the candidate block from the first node, the second node may obtain, from the candidate block, the first transaction information that is packaged into the candidate block by the first node.

212. The second node performs verification on the first transaction information in the candidate block to generate a second verification result, and executes the first transaction information in the candidate block to generate a second transaction execution result.

In this embodiment of this disclosure, after the second node obtains the first transaction information from the candidate block, the second node may perform verification on the first transaction information, and may also perform a transaction execution operation on the first transaction information. The verification performed by the second node on the first transaction information may also be referred to as validity verification. The validity verification may include at least one of the following verification manners: performing verification on a transaction data format and parameters, verifying whether there are duplicate transactions in a transaction list, verifying whether an input of the transaction is valid and whether double-spending occurs, verifying whether a signature of the transaction is correct, and verifying whether an input amount of the transaction is greater than or equal to an output amount. The execution of the first transaction information by the second node may generate the second transaction execution result. There may be a plurality of scenarios for executing the transaction, for example, adding or deducting fund from an account, which are not limited herein.

202. The first node performs verification on the first transaction information in the candidate block to generate a first verification result, and executes the first transaction information in the candidate block to generate a first transaction execution result.

In this embodiment of this disclosure, after the first node obtains the first transaction information from the candidate block, the first node may perform verification on the first transaction information, and may also perform a transaction execution operation on the first transaction information. The verification performed by the first node on the first transaction information may also be referred to as validity verification. The validity verification may include at least one of the following verification manners: performing verification on a transaction data format and parameters, verifying whether there are duplicate transactions in a transaction list, verifying whether an input of the transaction is valid and whether double-spending occurs, verifying whether a signature of the transaction is correct, and verifying whether an input amount of the transaction is greater than or equal to an output amount. The execution of the first transaction information by the first node may generate the first transaction execution result. There may be a plurality of scenarios for executing the transaction, which are not limited herein.

203. The first node broadcasts a first node processing result through the blockchain, the first node processing result including: the first verification result and the first transaction execution result.

In this embodiment of this disclosure, after the first node completes the transaction verification and the transaction execution, the first node may generate the first node processing result, the first node processing result including: the first verification result and the first transaction execution result. The first node broadcasts the first node processing result through the blockchain, and all nodes (including the follower node and the leader node) in the blockchain may receive the first node processing result.

213. The second node broadcasts a second node processing result through the blockchain, the second node processing result including: the second verification result and the second transaction execution result.

In this embodiment of this disclosure, after the second node completes the transaction verification and the transaction execution, the second node may generate the second node processing result, the second node processing result including: the second verification result and the second transaction execution result. The second node broadcasts the second node processing result through the blockchain, and all nodes (including the follower node and the leader node) in the blockchain may receive the second node processing result.

In the foregoing embodiments, an execution order of step 202 to step 203 and an execution order of step 211 to step 213 may not need to be in a sequential order. FIG. 2 is only a feasible implementation, and is not intended to limit the embodiments of this disclosure.

204. The first node receives a second node processing result broadcast by the second node through the blockchain, the second node processing result including: the second verification result generated by the second node by performing verification on the first transaction information in the candidate block, and the second transaction execution result generated by executing the first transaction information in the candidate block.

In this embodiment of this disclosure, the second node broadcasts the second node processing result through the blockchain, and the first node may receive the second node processing result broadcast by the second node through the blockchain.

205. The first node performs consensus on the candidate block according to the first node processing result and the second node processing result, then the first node saves the candidate block if a consensus on the candidate block is reached successfully, and saves the first transaction execution result if the first transaction information is executed successfully.

In this embodiment of this disclosure, the first node receives, through step 204, the second node processing result broadcast by the second node, and the first node may perform consensus on the candidate block according to the first node processing result and the second node processing result. For example, the first node may use the distributed consensus algorithm to perform consensus. The distributed consensus algorithm may be a Raft algorithm. In addition, the distributed consensus algorithm in this embodiment of this disclosure may alternatively be a BFT-Raft algorithm, which is a Raft algorithm that is compatible with BFT. The BFT is used for handling an unexpected failure behavior of a node caused by a hardware error, a network failure, and a malicious attack from a network node.

In this embodiment of this disclosure, the first node performs consensus on the candidate block, and then the first node saves the candidate block if a consensus on the candidate block is reached successfully, thereby completing the block generation of the candidate block. The first node may also save the first transaction execution result if the first transaction information is executed successfully, so that the first transaction execution result corresponding to the first transaction information may be found through querying in the subsequent processing procedure.

In some embodiments of this disclosure, that the first node saves the candidate block if a consensus on the candidate block is reached successfully in step 205 includes: saving, by the first node, header information of the candidate block if a consensus on the candidate block is reached successfully, and saving first transaction information that is successfully verified.

The first transaction information is packaged in the candidate block. After the first node performs consensus on the candidate block, the first node may specifically save the header information of the candidate block if a consensus on the candidate block is reached successfully, and save the first transaction information that is successfully verified. The header information of the candidate block, in terms of a data format, for example, may include a hash value, a root of Merkle tree, a root of state, a receipt root, a signature of node, a nonce, and the like of a previous block. The header information of the candidate block may be specifically determined according to an application scenario, which is not limited herein.

214. The second node saves the candidate block if the first transaction information is verified successfully, and saves the second transaction execution result if the first transaction information is executed successfully.

In this embodiment of this disclosure, after the second node broadcasts the second node processing result through the blockchain, the second node may determine whether to save the candidate block according to whether the first transaction information is verified successfully. When the first transaction information is verified successfully, the second node saves the candidate block, thereby completing the block generation of the candidate block. The second node may further save the second transaction execution result when the first transaction information is executed successfully, so that the second transaction execution result corresponding to the first transaction information can be found through querying in the subsequent processing procedure.

It may be learned from the descriptions of the embodiments of this disclosure in the foregoing embodiments that, if a first node is a leader node, and a second node is a follower node, the first node packages first transaction information in a transaction queue of the first node into a candidate block, and broadcasts the candidate block through a blockchain. Then the first node performs verification on the first transaction information in the candidate block to generate a first verification result, and executes the first transaction information in the candidate block to generate a first transaction execution result. The first node broadcasts a first node processing result through the blockchain, the first node processing result including: the first verification result and the first transaction execution result. The first node receives a second node processing result broadcast by the second node through the blockchain. The first node performs consensus on the candidate block according to the first node processing result and the second node processing result, and then the first node saves the candidate block if a consensus on the candidate block is reached successfully, and saves the first transaction execution result if the first transaction information is executed successfully. In the embodiments of this disclosure, the first node serves as the leader node. The first node may cache to-be-processed transaction information by using the transaction queue, and package the transaction information in the transaction queue into the candidate block, so that the candidate block can be broadcast, and the follower node in the blockchain can perform transaction verification and transaction execution. After broadcasting the candidate block, the first node can perform the following processing: transaction verification and transaction execution. Then the first node can broadcast the first node processing result. The first node performs consensus on the candidate block according to a processing result of each node in the blockchain, and saves the block when a consensus is reached successfully. In the embodiments of this disclosure, the order of block generation is changed, so that all nodes in the blockchain can perform transaction verification and transaction execution. Furthermore, this process may be performed in parallel in each node, therefore, the speed of block generation and the performance of transaction processing can be improved.

Figure 5:
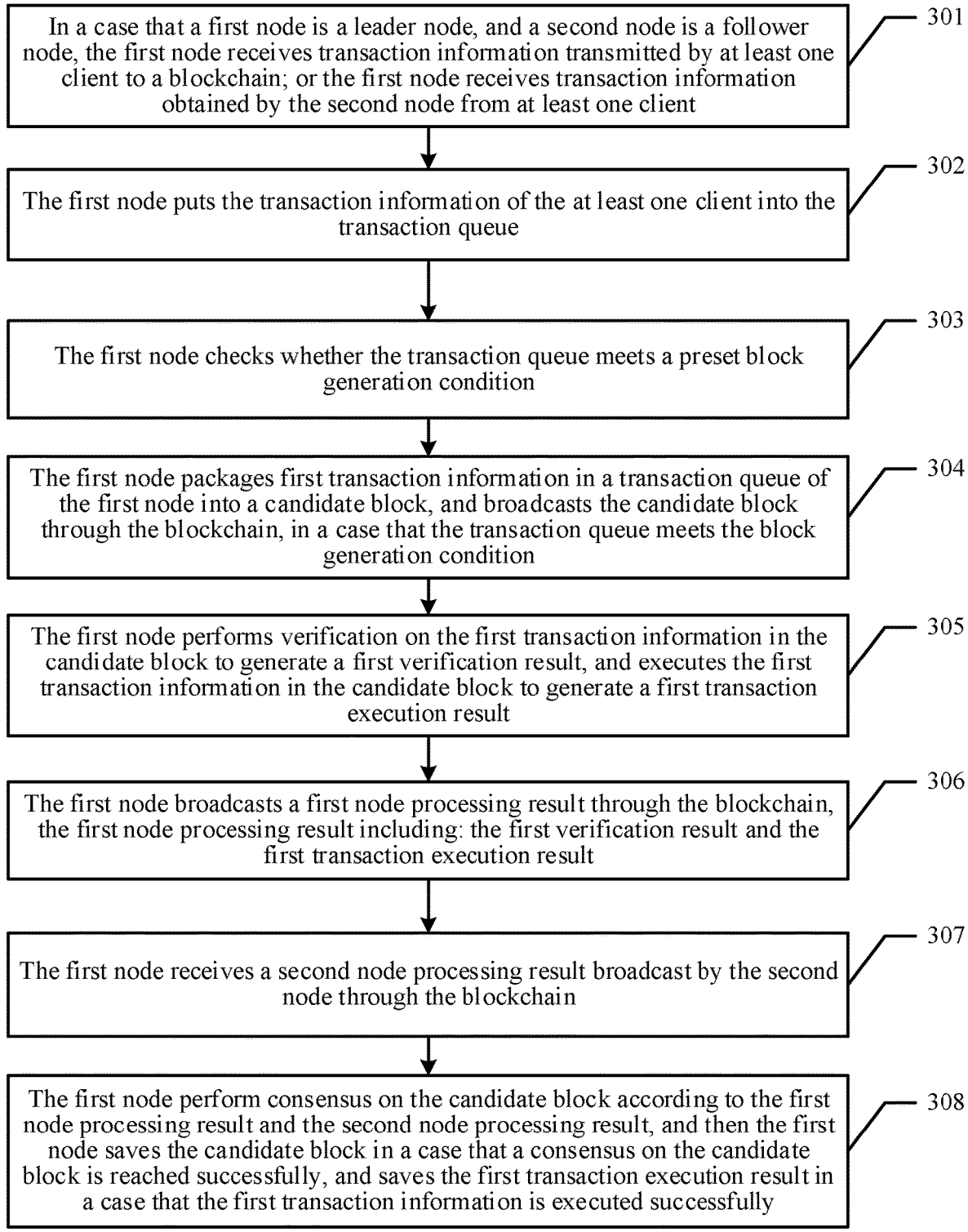
FIG. 5 is a schematic block flowchart of a block processing method performed by a leader node according to an embodiment of this disclosure.

The block processing method provided in this embodiment of this disclosure is described from a perspective of a first node. Referring to FIG. 5, the block processing method provided in this embodiment of this disclosure mainly includes the following steps.

301. If a first node is a leader node, and a second node is a follower node, the first node receives transaction information transmitted by at least one client to a blockchain.

It is not limited that, in some embodiments of this disclosure, step 301 may alternatively be replaced with the following step: receiving, by the first node, transaction information obtained by the second node from at least one client.

In this embodiment of this disclosure, after obtaining the transaction information of the user, the at least one client may transmit the transaction information to the blockchain. For example, the transaction information may be transmitted to the first node or the second node in the blockchain. Which may be specifically determined according to an application scenario. If the client directly transmits the transaction information to the first node, the first node receives the transaction information transmitted by the at least one client to the blockchain. If the client directly transmits the transaction information to the second node, the second node serving as the follower node may forward the transaction information to the first node after receiving the transaction information.

302. The first node adds the transaction information of the at least one client into the transaction queue.

In this embodiment of this disclosure, the first node maintains the transaction queue. After the first node obtains the transaction information of the at least one client, the first node adds the transaction information of the at least one client into the transaction queue.

303. The first node checks whether the transaction queue meets a preset block generation condition.

In this embodiment of this disclosure, the first node may be pre-configured with a block generation condition for the transaction queue, to check whether the transaction queue meets the preset block generation condition when new transaction information is stored in the transaction queue. The block generation condition is used for determining whether to perform block generation. If the transaction queue meets the block generation condition, the first node executes the block generation process, and if the transaction queue does not meet the block generation condition, the first node does not execute the block generation procedure, and continues determining whether the block generation condition is met. The block generation procedure is executed when the block generation condition is met.

In some embodiments of this disclosure, that the first node checks whether the transaction queue meets a preset block generation condition in step 303 includes:

checking, by the first node, whether a quantity of pieces of transaction information stored in the transaction queue exceeds a first threshold, determining, if the quantity of pieces of transaction information exceeds the first threshold, that the transaction queue meets the block generation condition, and determining, if the quantity of pieces of transaction information does not exceed the first threshold, that the transaction queue does not meet the block generation condition.

The first node counts a quantity of pieces of the transaction information stored in the transaction queue, the quantity of pieces of transaction information indicating the size of the transaction queue, checks whether the quantity of pieces of the transaction information meets a preset first threshold, the first threshold being a block generation threshold, where, for example, the first threshold may be 1000, determines that the transaction queue meets the block generation condition if the quantity of pieces of transaction information stored in the transaction queue reaches 1000, and determines that the transaction queue does not meet the block generation condition if the quantity of pieces of transaction information stored in the transaction queue does not reach 1000.

In some embodiments of this disclosure, that the first node checks whether the transaction queue meets a preset block generation condition in step 303 includes:

checking, by the first node, whether a volume of data stored in the transaction queue exceeds a second threshold, determining, if the volume of data exceeds the second threshold, that the transaction queue meets the block generation condition, and determining, if the volume of data does not exceed the second threshold, that the transaction queue does not meet the block generation condition.

The first node collects statistics about a volume of data stored in the transaction queue, the volume of data indicating a storage space occupied by the transaction queue, checks whether the volume of data meets a preset second threshold, the second threshold being a block generation threshold, where for example, the second threshold may be 1 MB (megabyte), determines that the transaction queue meets the block generation condition if the volume of data stored in the transaction queue reaches 1 MB, and determines that the transaction queue does not meet the block generation condition if the volume of data stored in the transaction queue does not reach 1 MB.

In some embodiments of this disclosure, that the first node checks whether the transaction queue meets a preset block generation condition in step 303 includes:

checking, by the first node, whether a time difference between a previous block generation time of the transaction queue and a current time exceeds a block generation time threshold, determining, if the time difference exceeds the block generation time threshold, that the transaction queue meets the block generation condition, and determining, if the time difference does not exceed the block generation time threshold, that the transaction queue does not meet the block generation condition.

The first node may alternatively count a quantity of times of block generation of the transaction queue, record a block generation time each time a block of the transaction queue is generated, calculate a time difference between a previous block generation time and a current time in real time, check whether the time difference exceeds a block generation time threshold, determines that the transaction queue meets the block generation condition if the time difference exceeds the block generation time threshold, and determines that the transaction queue does not meet the block generation condition if the time difference does not exceed the block generation time threshold. For example, the block generation time threshold may be 5 seconds.

304. The first node packages first transaction information in a transaction queue of the first node into a candidate block, and broadcasts the candidate block through the blockchain, if the transaction queue meets the block generation condition.

In this embodiment of this disclosure, the first node packages the first transaction information in the transaction queue of the first node into the candidate block in response to determining that the transaction queue meets the block generation condition, and broadcasts the candidate block, so that all the nodes in the blockchain may receive the candidate block.

305. The first node performs verification on the first transaction information in the candidate block to generate a first verification result, and executes the first transaction information in the candidate block to generate a first transaction execution result.

306. The first node broadcasts a first node processing result through the blockchain, the first node processing result including: the first verification result and the first transaction execution result.

307. The first node receives a second node processing result broadcast by the second node through the blockchain, the second node processing result including: the second verification result generated by the second node by performing verification on the first transaction information in the candidate block, and the second transaction execution result generated by executing the first transaction information in the candidate block.

308. The first node performs consensus on the candidate block according to the first node processing result and the second node processing result, and then the first node saves the candidate block if a consensus on the candidate block is reached successfully, and saves the first transaction execution result if the first transaction information is executed successfully.

In this embodiment of this disclosure, the execution procedure of step 304 to step 308 is similar to the execution procedure of step 202 to step 205, and details are not described herein again.

In some embodiments of this disclosure, when the first node performs any one of step 304 to step 308, the block generation processing method provided in this embodiments of this disclosure may further include the following steps:

packaging, by the first node, second transaction information in the transaction queue into the candidate block if the first transaction information is packaged into the candidate block, and broadcasting the candidate block through the blockchain;

performing, by the first node, verification on the second transaction information in the candidate block to generate a third verification result, and executing the second transaction information in the candidate block to generate a third transaction execution result;

broadcasting, by the first node, a third node processing result through the blockchain, the third node processing result including: the third verification result and the third transaction execution result;

receiving, by the first node, a fourth node processing result broadcast by the second node through the blockchain, the fourth node processing result including: a fourth verification result generated by the second node by performing verification on the second transaction information in the candidate block, and a fourth transaction execution result generated by executing the second transaction information in the candidate block; and performing, by the first node, consensus on the candidate block according to the third node processing result and the fourth node processing result, then saving, by the first node, the candidate block if a consensus on the candidate block is reached successfully, and saving the third transaction execution result if the second transaction information is executed successfully.

The transaction queue of the first node stores the first transaction information and the second transaction information. When performing any procedure of packaging, verification, execution, consensus, and saving on the first transaction information, the first node may further perform a procedure, such as packaging, verification, execution, consensus, or saving, on the second transaction information at the same time. Therefore, during the block generation procedure in this embodiment of this disclosure, a block concurrent verification algorithm is used for concurrently performing verification on blocks that are not dependent on each other, thereby further improving the efficiency of the block generation.

It may be learned from the descriptions of the embodiments of this disclosure in the foregoing embodiments that, in the embodiments of this disclosure, the first node serves as the leader node. The first node may cache to-be-processed transaction information by using the transaction queue, and package the transaction information in the transaction queue into the candidate block, so that the candidate block may be broadcast, and the follower node in the blockchain may perform transaction verification and transaction execution. After broadcasting the candidate block, the first node may perform the following processing: transaction verification and transaction execution, to obtain first node processing result. Then the first node may broadcast the first node processing result. The first node performs consensus on the candidate block according to a processing result of each node in the blockchain, and saves the block when a consensus is reached successfully. In the embodiments of this disclosure, the order of block generation is changed, so that all nodes in the blockchain can perform transaction verification and transaction execution, and therefore, the speed of block generation and the performance of transaction processing can be improved.

Figure 6:
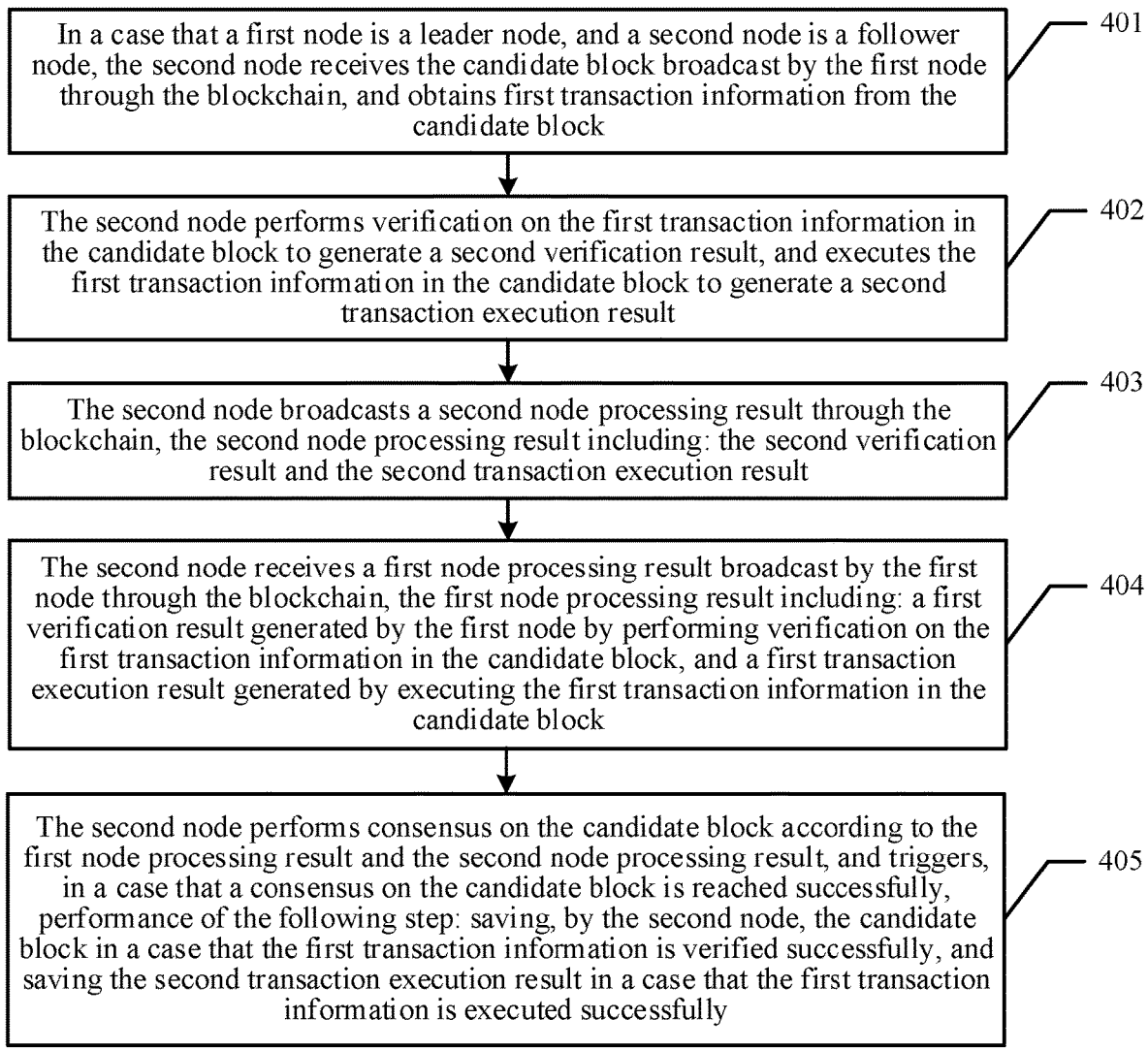
FIG. 6 is a schematic block flowchart of a block processing method performed by a follower node according to an embodiment of this disclosure.

The block processing method provided in the embodiments of this disclosure is also described from a perspective of the second node. Referring to FIG. 6, the block processing method provided in this embodiment of this disclosure mainly includes the following steps.

401. In a case that a first node is a leader node, and a second node is a follower node, the second node receives a candidate block broadcast by the first node through a blockchain, and obtains first transaction information from the candidate block.

402. The second node performs verification on the first transaction information in the candidate block to generate a second verification result, and executes the first transaction information in the candidate block to generate a second transaction execution result.

403. The second node broadcasts a second node processing result through the blockchain, the second node processing result including: the second verification result and the second transaction execution result.

In this embodiment of this disclosure, the execution procedure of step 401 to step 403 is similar to the execution procedure of step 211 to step 213 in the embodiment of FIG. 4, and details are not described herein again.

404. The second node receives a first node processing result broadcast by the first node through the blockchain, the first node processing result including: a first verification result generated by the first node by performing verification on the first transaction information in the candidate block, and a first transaction execution result generated by executing the first transaction information in the candidate block.

In some embodiments of this disclosure, in addition to that the leader node (that is, the first node) in the blockchain may perform consensus, the follower node in the blockchain may also perform consensus. For example, the second node receives, through step 404, the first node processing result broadcast by the first node, and the second node may perform consensus on the candidate block according to the first node processing result and the second node processing result. For example, the second node may use a distributed consensus algorithm to perform consensus. The distributed consensus algorithm may be a Raft algorithm. In addition, the distributed consensus algorithm in this embodiment of this disclosure may alternatively be a BFT-Raft algorithm.

405. The second node performs consensus on the candidate block according to the first node processing result and the second node processing result, and performs the following step if a consensus on the candidate block is reached successfully: saving, by the second node, the candidate block if the first transaction information is verified successfully, and saving the second transaction execution result if the first transaction information is executed successfully.

In this embodiment of this disclosure, the second node may perform consensus on the candidate block. If a consensus on the candidate block is reached successfully, the second node saves the candidate block if the first transaction information is verified successfully, and saves the second transaction execution result if the first transaction information is executed successfully. In the blockchain, if the first node may be malicious, the second node broadcasts the second node processing result, so that all the nodes in the blockchain receive the processing results of other nodes. Each node determines whether the data can be submitted and saved according to the received node processing results rather than only relying on a notification from the first node, thereby ensuring the correct execution of the first transaction information.

In some embodiments of this disclosure, after the second node broadcasts the second node processing result through the blockchain in step 403, the following alternative steps may be used as step 404 to step 405:

receiving, by the second node, a notification message transmitted by the first node if a consensus on the candidate block is reached successfully on the first node; and triggering, by the second node, according to the notification message, performance of the following step: saving, by the second node, the candidate block if the first transaction information is verified successfully by the second node, and saving the second transaction execution result if the first transaction information is executed successfully by the second node.

The first node may perform consensus on the candidate block. If a consensus on the candidate block is reached successfully, the first node broadcasts the notification message, and the second node in the blockchain may receive the notification message and determine, according to the notification message, that a consensus is reached successfully. Then the second node saves the candidate block if the first transaction information is verified successfully, and saves the second transaction execution result if the first transaction information is executed successfully.

In some embodiments of this disclosure, when the first node performs any one of step 304 to step 308, the block generation processing method may further include the following steps:

receiving, by the second node, the candidate block including second transaction information broadcast by the first node through the blockchain, and obtaining the second transaction information from the candidate block;

performing, by the second node, verification on the second transaction information in the candidate block to generate a fourth verification result, and executing the second transaction information in the candidate block to generate a fourth transaction execution result;

broadcasting, by the second node, a fourth node processing result through the blockchain, the fourth node processing result including: the fourth verification result and the fourth transaction execution result; and saving, by the second node, the candidate block if the second transaction information is verified successfully, and saving the fourth transaction execution result if the second transaction information is executed successfully.

The transaction queue of the first node stores the first transaction information and the second transaction information. When performing any procedure of packaging, verification, execution, consensus, and saving on the first transaction information, the first node may further perform a procedure, such as packaging, verification, execution, consensus, or saving, on the second transaction information at the same time. When the second node receives the broadcast of the first node, the second node may also verifies and executes the second transaction information. Therefore, during the block generation procedure in this embodiment of this disclosure, a block concurrent verification algorithm is used for concurrently performing verification on blocks that are independent with each other, thereby further improving the efficiency of the block generation.

It may be learned from the descriptions of the embodiments of this disclosure that, the first node serves as the leader node. The first node may cache to-be-processed transaction information by using a transaction queue, and package the transaction information in the transaction queue into the candidate block, so that the candidate block can be broadcast, and the second node can perform transaction verification and transaction execution. Then the second node can broadcast the second node processing result, so that the first node performs consensus on the candidate block according to a processing result of each node in the blockchain, and saves the block when a consensus is reached successfully. In the embodiments of this disclosure, the process of block generation, such as the order is changed, and the block generation task is distributed among all the node in the blockchain, so that all the nodes can perform transaction verification and transaction execution, and therefore, the speed of block generation and the performance of transaction processing can be improved.

For better understanding and implementation of the foregoing solutions of this embodiment of this disclosure, the following makes a specific description by using a corresponding application scenario as an example.

This embodiment of this disclosure provides a novel block generation solution. An example in which a first node is specifically a leader node, and a second node is specifically a follower node is used. In this embodiment of this disclosure, an unverified series of transactions may be packaged into a candidate block, and be broadcast by the leader node to the follower node by using the BFT-Raft algorithm. Both the leader node and the follower node may serve as consensus nodes and may validate and execute the transactions during a verification process of the candidate block, and mark a transaction verification/execution result as a success or a failure. Finally, all the consensus nodes perform consensus on the verification results of the candidate block. After a consensus is reached successfully, all the nodes save the candidate block, save a transaction marked as a success in the candidate block, and remove a failed transaction.

Figure 7:
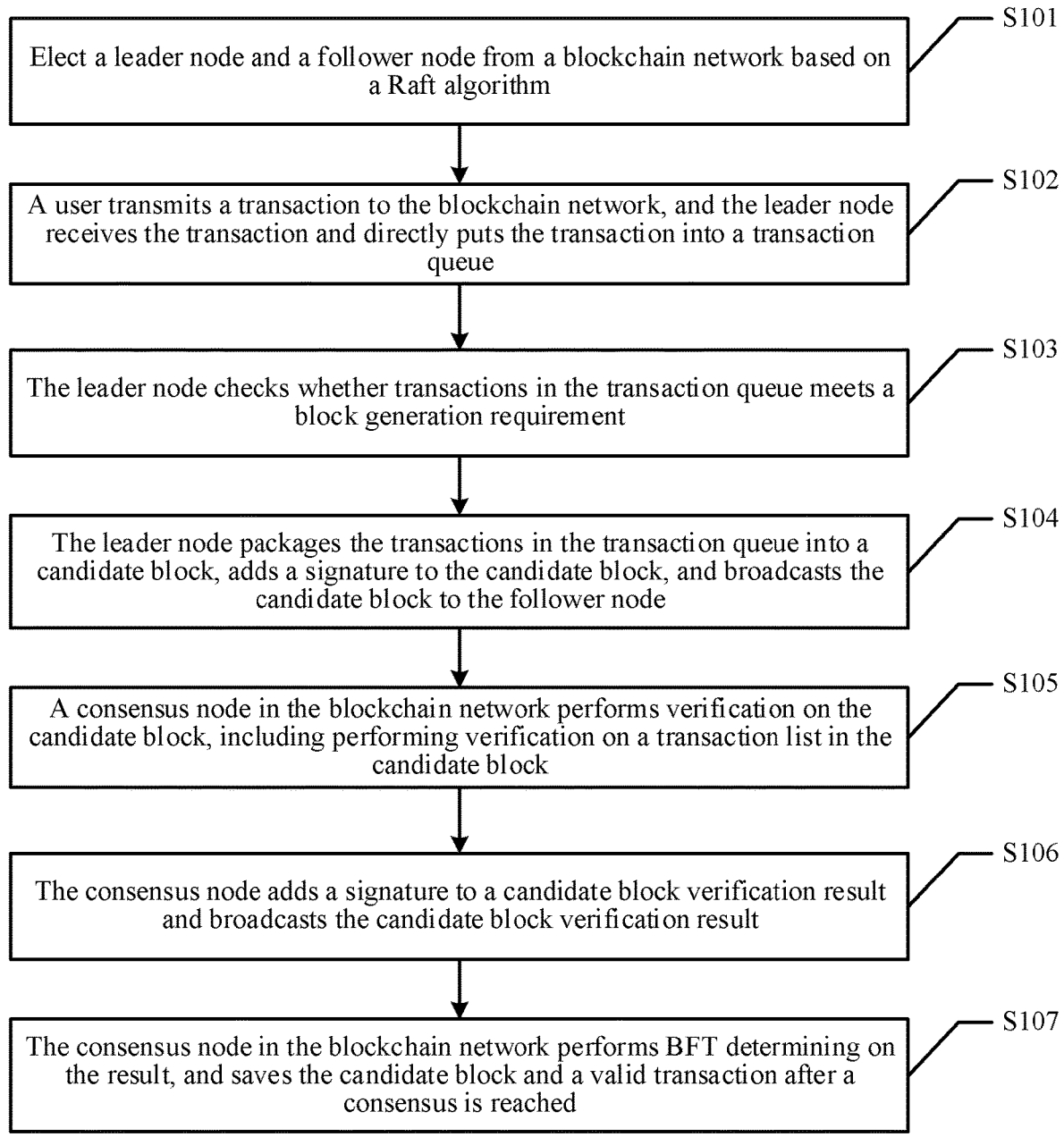
FIG. 7 is a schematic diagram of an application scenario of a block generation procedure according to an embodiment of this disclosure.

FIG. 7 is a schematic diagram of an application scenario of a block generation procedure according to an embodiment of this disclosure. The following procedure is included.

S101. Elect a leader node and a follower node from a blockchain network based on a Raft algorithm.

A node role selection procedure is first performed. For example, the Raft algorithm may be run on all the nodes of the blockchain network to elect the leader node and the follower node, where there is only one leader node in the blockchain.

S102. A user transmits a transaction to the blockchain, and the leader node receives the transaction and adds the transaction into a transaction queue.

The user may transmit the transaction to the blockchain by using a terminal. For the transaction that is transmitted to the leader node, the leader node adds the transaction into the transaction queue directly. Alternatively, for the transaction that is transmitted to the follower node, the follower node forwards the transaction to the leader node, and then the leader node adds the transaction into the transaction queue.

S103. The leader node checks whether transactions in the transaction queue meets a block generation requirement.

S104. If the block generation requirement is met, the leader node packages the transactions in the transaction queue into a candidate block, adds a signature to the candidate block, and broadcasts the candidate block to the follower node.

The leader node checks whether the transaction queue meets the block generation requirement, for example, detects whether a quantity of transactions or a volume of data of transactions stored in the transaction queue meets the block generation requirement. If the block generation requirement is met, the transactions in the transaction queue are packaged into the candidate block, a signature is added to the candidate block, and the candidate block is broadcast. If the block generation requirement is not met, the leader node may further check whether a block generation time has arrived. If the block generation time has arrived, the leader node packages the transactions in the transaction queue into the candidate block, adds a signature to the candidate block, and broadcasts the candidate block. In some implementations, a periodic block generation timer may be deployed and the leader node may check the transaction queue each time the block generation timer expires.

S105. A consensus node in the blockchain network performs verification on the candidate block, including performing verification on a transaction list in the candidate block.

S106. The consensus node adds a signature to a candidate block verification result and broadcasts the candidate block verification result.

The leader node and the follower node, serving as consensus nodes, perform verification on the candidate block, during the verification procedure, perform validity verification on each transaction in the transaction list in the candidate block, mark a transaction as a valid transaction or an invalid transaction, execute the transaction, generate a transaction execution result, and cache a valid transaction execution result.

S107. The consensus node in the blockchain network performs BFT determining on the result, and saves the candidate block and a valid transaction after a consensus is reached.

The leader node and the follower node each add a signature to respective verification results and execution results thereof in the foregoing step S106 to obtain a signed result. Then consensus is performed on a received signed result by using the BFT algorithm. The signed result include: the verification result, the transaction execution result, and a signature by the corresponding signing node.

After a consensus on the signed result is reached successfully by the leader node and the follower node, the nodes save header information of the candidate block, the valid transaction in the candidate block, and the transaction execution result cached in the candidate block. Saving the valid transaction in the candidate block refers to saving original transaction data transmitted by the user (that is, the transaction execution result is not included herein), and saving the transaction execution results refers to saving a transaction execution result state.

The header information of the candidate block, in term of a data format of the block, includes a hash value, a root of Merkle tree, a root of state, a receipt root, a signature of node, and a nonce of a previous block.

Figure 8:
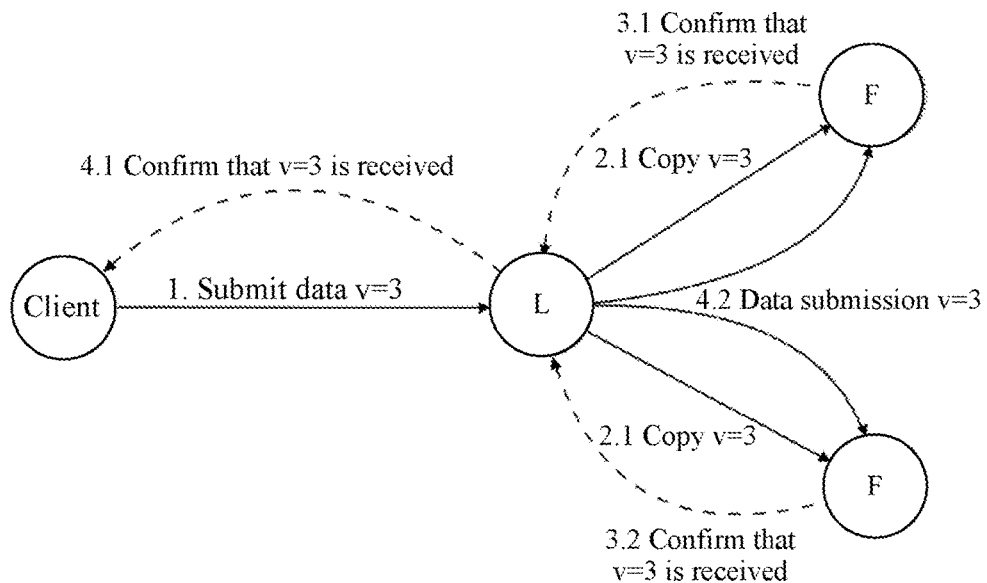
FIG. 8 is a schematic diagram of a Raft data submission procedure according to an embodiment of this disclosure.

FIG. 8 is a schematic diagram of a Raft data submission procedure according to an embodiment of this disclosure. In FIG. 8, L represents a leader node, and F represents a follower node. The following procedure is included.

Step 1. A client submits data v=3 and transmits the data v=3 to the leader node.

Step 2.1. The leader node copies the data v=3 and transmits the data v=3 to follower nodes.

Step 3.1. A follower node confirms that the data v=3 is received and transmits the data v=3 to the leader node.

Step 3.2. Another follower node confirms that the data v=3 is received and transmits the data v=3 to the leader node.

Step 4.1. The leader node confirms that the data v=3 is received and transmits the data v=3 to the client.

Step 4.2. The leader node submits the data v=3 and transmits the data v=3 to the follower nodes.

In the foregoing procedure, a fault tolerance technology of the Raft algorithm is based on a leader node. After receiving the data of the leader node, the follower nodes cache the data, and return results to the leader node. The leader node receives the results from the follower nodes for fault tolerance determining. In a case that a proportion of nodes that receive the same result is greater than 50% or a predetermined percentage, the data is considered to be successful, and then the leader node instructs the follower nodes to save the state of data.

Figure 9:
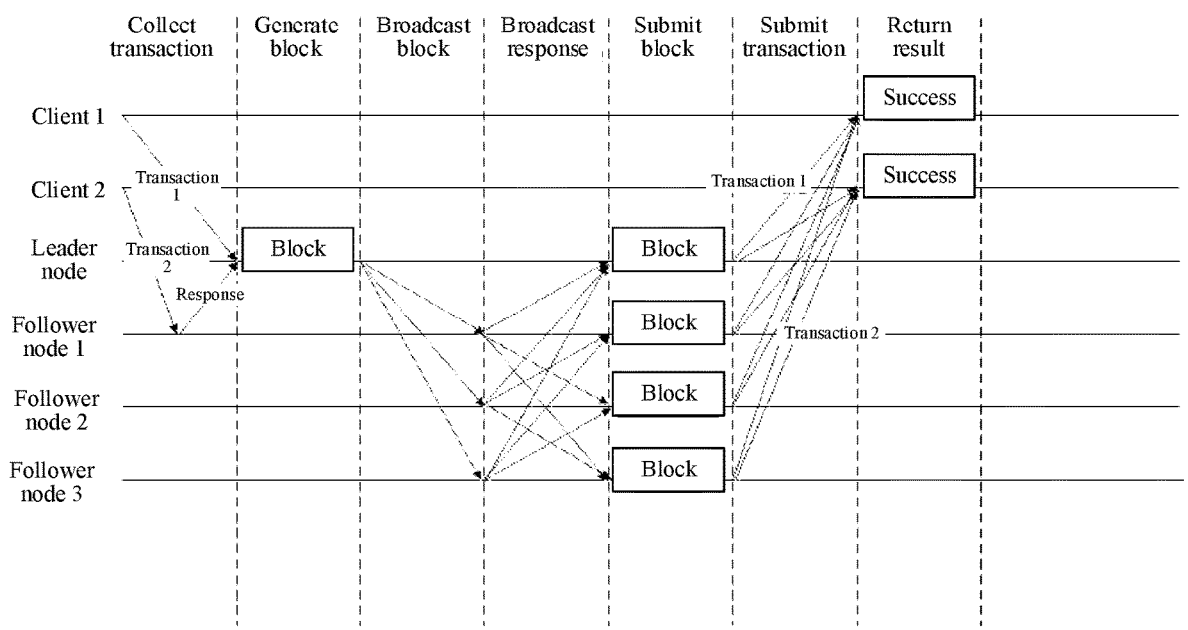
FIG. 9 is a schematic diagram of a BFT-Raft data submission procedure according to an embodiment of this disclosure.

FIG. 9 is a schematic diagram of a BFT-Raft data submission procedure according to an embodiment of this disclosure. The following procedure is included.

A client 1 generates a transaction 1 and transmits the transaction 1 to a leader node. A client 2 generates a transaction 2 and transmits the transaction 2 to a follower node 1. The follower node 1 further transmits the transaction 2 to the leader node. After the leader node generates a block, the block is broadcast to three follower nodes. The three follower nodes transmit a broadcast response to a blockchain. The leader node and the three follower nodes submit the block and perform consensus. After a consensus is reached successfully, the leader node and the three follower nodes transmit submission success messages to the client 1 and the client 2

In the blockchain, the fault tolerance technology shown in the embodiment of FIG. 8 may not deal with a situation where the leader node is malicious, and therefore, the BFT technology is added in this application. The foregoing follower nodes broadcast the result, so that all the nodes in the blockchain network receive signed results of other nodes. Each node determines, according to the received signed results from all other nodes rather than solely relying on a notification from the leader node, whether the data is legit and may be submitted and saved.

In this embodiment of this disclosure, in step S101 to step S107, a block concurrent verification technology may be further used. That is, there are a plurality of transactions in a block, and during a block generation procedure, a block concurrent verification algorithm is used for concurrently performing verification on blocks that are independent with each other.

The foregoing solutions provided in this embodiment of this disclosure can improve the speed of block generation and the performance of transaction processing in an alliance chain or a private chain.

The foregoing method embodiments are expressed as a series of action combinations for the purpose of brief description, but a person skilled in the art is to learn that because some steps may be performed in other sequences or simultaneously according to the embodiments of this disclosure, the embodiments of this disclosure are not limited to a described action sequence. In addition, a person skilled in the art is also to learn that the embodiments described in this specification are only example embodiments; and therefore, an action and a module involved are not necessarily mandatory in the embodiments of this disclosure.

For the convenience of a better implementation of the foregoing solutions of the embodiments of this disclosure, the following further provides related apparatuses configured to implement the foregoing solutions.

Figure 10:
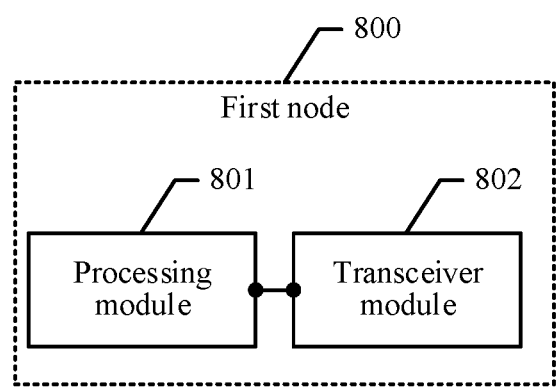
FIG. 10 is a schematic structural diagram of composition of a first node according to an embodiment of this disclosure.

Referring to FIG. 10, this embodiment of this disclosure provides a first node 800 in a blockchain, the blockchain further including a second node, the first node being a leader node, the second node being a follower node, and the first node 800 including: a processing module 801 and a transceiver module 802.

The processing module is configured to package first transaction information in a transaction queue of the first node into a candidate block.

The transceiver module is configured to broadcast the candidate block through the blockchain.

The processing module is further configured to perform verification on the first transaction information in the candidate block to generate a first verification result, and execute the first transaction information in the candidate block to generate a first transaction execution result.

The transceiver module is further configured to broadcast a first node processing result through the blockchain, the first node processing result including: the first verification result and the first transaction execution result.

The transceiver module is further configured to receive a second node processing result broadcast by the second node through the blockchain, the second node processing result including: a second verification result generated by the second node by performing verification on the first transaction information in the candidate block, and a second transaction execution result generated by executing the first transaction information in the candidate block.

The processing module is further configured to perform consensus on the candidate block according to the first node processing result and the second node processing result, and then save, by the first node, the candidate block if a consensus on the candidate block is reached successfully, and save the first transaction execution result if the first transaction information is executed successfully.

In some embodiments of this disclosure, before the transceiver module packages the first transaction information in the transaction queue of the first node into the candidate block, the processing module is further configured to check whether the transaction queue meets a preset block generation condition; and trigger, if the transaction queue meets the block generation condition, performance of the following step: packaging the first transaction information in the transaction queue of the first node into the candidate block.

In some embodiments of this disclosure, the processing module is further configured to check whether a quantity of pieces of transaction information stored in the transaction queue exceeds a first threshold, determine, if the quantity of pieces of transaction information exceeds the first threshold, that the transaction queue meets the block generation condition, and determine, if the quantity of pieces of transaction information does not exceed the first threshold, that the transaction queue does not meet the block generation condition.

In some embodiments of this disclosure, the processing module is further configured to check whether a volume of data stored in the transaction queue exceeds a second threshold, determine if the volume of data exceeds the second threshold, that the transaction queue meets the block generation condition, and determine, if the volume of data does not exceed the second threshold, that the transaction queue does not meet the block generation condition.

In some embodiments of this disclosure, the processing module is further configured to check whether a time difference between a previous block generation time of the transaction queue and a current time exceeds a block generation time threshold, determine, if the time difference exceeds the block generation time threshold, that the transaction queue meets the block generation condition, and determine, if the time difference does not exceed the block generation time threshold, that the transaction queue does not meet the block generation condition.

In some embodiments of this disclosure, the transceiver module is further configured to receive transaction information transmitted by at least one client to the blockchain. Alternatively, the first node receives transaction information obtained by the second node from at least one client.

The processing module is further configured to add the transaction information of the at least one client into the transaction queue.

In some embodiments of this disclosure, the processing module is further configured to package second transaction information in the transaction queue into the candidate block if the first transaction information is packaged into the candidate block.

The transceiver module is further configured to broadcast the candidate block through the blockchain.

The processing module is further configured to perform verification on the second transaction information in the candidate block to generate a third verification result, and execute the second transaction information in the candidate block to generate a third transaction execution result.

The transceiver module is further configured to broadcast a third node processing result through the blockchain, the third node processing result including: the third verification result and the third transaction execution result.

The transceiver module is further configured to receive a fourth node processing result broadcast by the second node through the blockchain, the fourth node processing result including: a fourth verification result generated by the second node by performing verification on the second transaction information in the candidate block, and a fourth transaction execution result generated by executing the second transaction information in the candidate block.

The processing module is further configured to perform consensus on the candidate block according to the third node processing result and the fourth node processing result, and then save, by the first node, the candidate block if a consensus on the candidate block is reached successfully, and save the third transaction execution result if the second transaction information is executed successfully.

In some embodiments of this disclosure, the processing module is further configured to save header information of the candidate block if a consensus on the candidate block is reached successfully, and save first transaction information that is successfully verified.

It may be learned from the descriptions of the embodiments of this disclosure that, if a first node is a leader node, and a second node is a follower node, the first node packages first transaction information in a transaction queue of the first node into a candidate block, and broadcasts the candidate block through a blockchain. Then the first node performs verification on the first transaction information in the candidate block to generate a first verification result, and executes the first transaction information in the candidate block to generate a first transaction execution result. The first node broadcasts a first node processing result through the blockchain, the first node processing result including: the first verification result and the first transaction execution result. The first node receives a second node processing result broadcast by the second node through the blockchain. The first node performs consensus on the candidate block according to the first node processing result and the second node processing result, and then the first node saves the candidate block if a consensus on the candidate block is reached successfully, and saves the first transaction execution result if the first transaction information is executed successfully. In the embodiments of this disclosure, the first node serves as the leader node. The first node may cache to-be-processed transaction information by using the transaction queue, and package the transaction information in the transaction queue into the candidate block, so that the candidate block can be broadcast, and the follower node in the blockchain can perform transaction verification and transaction execution. After broadcasting the candidate block, the first node can perform the following processing: transaction verification and transaction execution. Then the first node can broadcast the first node processing result. The first node performs consensus on the candidate block according to a processing result of each node in the blockchain, and saves the block when a consensus is reached successfully. In the embodiments of this disclosure, the order of block generation is changed, so that all nodes in the blockchain can perform transaction verification and transaction execution. Furthermore, this process may be performed in parallel in each node, therefore, the speed of block generation and the performance of transaction processing can be improved.

Figure 11:
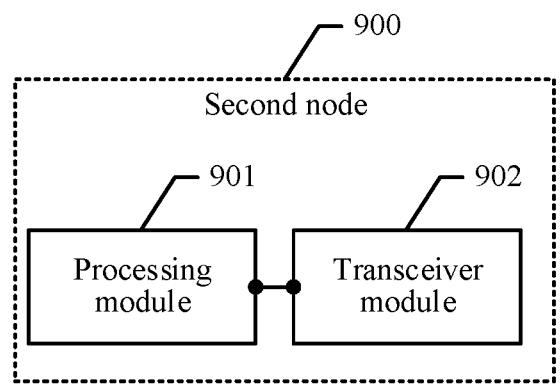
FIG. 11 is a schematic structural diagram of composition of a second node according to an embodiment of this disclosure.

Referring to FIG. 11, this embodiment of this disclosure provides a second node 900 in a blockchain, the blockchain further including a first node, the first node being a leader node, the second node being a follower node, and the second node 900 including: a processing module 901 and a transceiver module 902.

The transceiver module is configured to receive a candidate block broadcast by the first node through the blockchain.

The processing module is configured to obtain first transaction information from the candidate block.

The processing module is further configured to perform verification on the first transaction information in the candidate block to generate a second verification result, and execute the first transaction information in the candidate block to generate a second transaction execution result.

The transceiver module is further configured to broadcast a second node processing result through the blockchain, the second node processing result including: the second verification result and the second transaction execution result.

The processing module is further configured to save the candidate block if the first transaction information is verified successfully, and save the second transaction execution result if the first transaction information is executed successfully.

In some embodiments of this disclosure, after broadcasting the second node processing result through the blockchain, the transceiver module receives a first node processing result broadcast by the first node through the blockchain, the first node processing result including: a first verification result generated by the first node by performing verification on the first transaction information in the candidate block, and a first transaction execution result generated by executing the first transaction information in the candidate block.

The processing module is further configured to perform consensus on the candidate block according to the first node processing result and the second node processing result, and trigger, if a consensus on the candidate block is reached successfully, performance of the following step: saving the candidate block if the first transaction information is verified successfully, and saving the second transaction execution result if the first transaction information is executed successfully.

In some embodiments of this disclosure, after broadcasting the second node processing result through the blockchain, the transceiver module receives a notification message transmitted by the first node if a consensus on the candidate block is reached successfully.

The processing module is further configured to trigger, according to the notification message, performance of the following step: saving the candidate block if the first transaction information is verified successfully, and saving the second transaction execution result if the first transaction information is executed successfully.

In some embodiments of this disclosure, the transceiver module is further configured to receive the candidate block broadcast by the first node through the blockchain, and obtain second transaction information obtained from the candidate block.

The processing module is further configured to perform verification on the second transaction information in the candidate block to generate a fourth verification result, and execute the second transaction information in the candidate block to generate a fourth transaction execution result.

The transceiver module is further configured to broadcast a fourth node processing result through the blockchain, the fourth node processing result including: the fourth verification result and the fourth transaction execution result.

The processing module is further configured to save the candidate block if the second transaction information is verified successfully, and save the fourth transaction execution result if the second transaction information is executed successfully.

It may be learned from the descriptions of the embodiments of this disclosure that, in the embodiments of this disclosure, the first node serves as the leader node. The first node may cache to-be-processed transaction information by using the transaction queue, and package the transaction information in the transaction queue into the candidate block, so that the candidate block may be broadcast, and the second node may perform transaction verification and transaction execution. Then the second node may broadcast the second node processing result, so that the first node performs consensus on the candidate block according to a processing result of each node in the blockchain, and saves the block when a consensus is reached successfully. In the embodiments of this disclosure, the order of block generation is changed, so that all nodes in the blockchain can perform transaction verification and transaction execution, and therefore, the speed of block generation and the performance of transaction processing can be improved.

In an exemplary embodiment, referring to FIG. 10, this embodiment of this disclosure provides another first node 800 in a blockchain, the blockchain further including a second node, the first node being a leader node, the second node being a follower node, and the first node 800 including: a processing module 801 and a transceiver module 802.

The processing module is configured to add, in response to at least one client transmitting transaction information to the blockchain, the transaction information transmitted by the client into a transaction queue of the first node.

The processing module is further configured to check whether the transaction queue meets a preset block generation condition.

The transceiver module is configured to package, in response to the transaction queue meeting the block generation condition, first transaction information in a transaction queue of the first node into a candidate block, add a signature to the candidate block, and broadcast the candidate block through the blockchain.

The processing module is further configured to perform verification on the first transaction information in the candidate block to generate a first verification result, and execute the first transaction information in the candidate block to generate a first transaction execution result.

The transceiver module is further configured to add a signature to a first node processing result, and then broadcast the first node processing result through the blockchain, the first node processing result including: the first verification result and the first transaction execution result;

The transceiver module is further configured to receive a second node processing result broadcast by the second node through the blockchain, the second node processing result including: a second verification result generated by the second node by performing verification on the first transaction information in the candidate block, and a second transaction execution result generated by executing the first transaction information in the candidate block.

The processing module being further configured to perform, according to the first node processing result and the second node processing result, consensus on the candidate block by using a distributed consensus algorithm, and then save the candidate block if a consensus on the candidate block is reached successfully, and save the first transaction execution result if the first transaction information is executed successfully.

In some embodiments of this disclosure, the transceiver module is further configured to package second transaction information in the transaction queue into the candidate block if the first transaction information is packaged into the candidate block, add a signature to the candidate block, and then broadcast the candidate block through the blockchain.

The processing module is further configured to perform verification on the second transaction information in the candidate block to generate a third verification result, and execute the second transaction information in the candidate block to generate a third transaction execution result.

The transceiver module is further configured to add a signature to a third node processing result, and then broadcast the third node processing result through the blockchain, the third node processing result including: the third verification result and the third transaction execution result.

The processing module is further configured to receive a fourth node processing result broadcast by the second node through the blockchain, the fourth node processing result including: a fourth verification result generated by the second node by performing verification on the second transaction information in the candidate block, and a fourth transaction execution result generated by executing the second transaction information in the candidate block.

The processing module is further configured to perform, by the first node, consensus on the candidate block according to the third node processing result and the fourth node processing result, and then save the candidate block if a consensus on the candidate block is reached successfully, and save the third transaction execution result if the second transaction information is executed successfully.

In some embodiments of this disclosure, the processing module is further configured to save header information of the candidate block if a consensus on the candidate block is reached successfully, and save first transaction information that is verified successfully, the header information of the candidate block including: a hash value, a root of Merkle tree, a root of state, a receipt root, a signature of node, and a nonce of a previous block of the candidate block.

It may be learned from the descriptions of the embodiments of this disclosure in the foregoing embodiments that, in the embodiments of this disclosure, the first node serves as the leader node. The first node may cache to-be-processed transaction information by using the transaction queue, and package the transaction information in the transaction queue into the candidate block, so that the candidate block can be broadcast, and the follower node in the blockchain can perform transaction verification and transaction execution. After broadcasting the candidate block, the first node can perform the following processing: transaction verification and transaction execution to obtain first node processing result. Then the first node can broadcast the first node processing result. The first node performs consensus on the candidate block according to a processing result of each node in the blockchain, and saves the block when a consensus is reached successfully. In the embodiments of this disclosure, the order of block generation is changed, so that all nodes in the blockchain can perform transaction verification and transaction execution, and therefore, the speed of block generation and the performance of transaction processing can be improved.

In an exemplary embodiment, referring to FIG. 11, this embodiment of this disclosure provides another second node 900 in a blockchain, the blockchain further including a first node, the first node being a leader node, the second node being a follower node, and the second node 900 including: a processing module 901 and a transceiver module 902.

The transceiver module is configured to receive a candidate block broadcast by the first node through the blockchain, and obtain first transaction information from the candidate block.

The processing module is configured to perform verification on the first transaction information in the candidate block to generate a second verification result, and execute the first transaction information in the candidate block to generate a second transaction execution result.

The transceiver module is configured to add a signature a second node processing result, and then broadcast the second node processing result through the blockchain, the second node processing result including: the second verification result and the second transaction execution result.

The processing module is configured to save the candidate block if the first transaction information is verified successfully, and save the second transaction execution result if the first transaction information is executed successfully.

It may be learned from the descriptions of the embodiments of this disclosure that, in the embodiments of this disclosure, the first node serves as the leader node. The first node may cache to-be-processed transaction information by using the transaction queue, and package the transaction information in the transaction queue into the candidate block, so that the candidate block can be broadcast, and the second node can perform transaction verification and transaction execution. Then the second node can broadcast the second node processing result, so that the first node performs consensus on the candidate block according to a processing result of each node in the blockchain, and saves the block when a consensus is reached successfully. In the embodiments of this disclosure, the order of block generation is changed, so that all nodes in the blockchain can perform transaction verification and transaction execution. Furthermore, this process may be performed in parallel in each node, and therefore, the speed of block generation and the performance of transaction processing can be improved.

Figure 12:
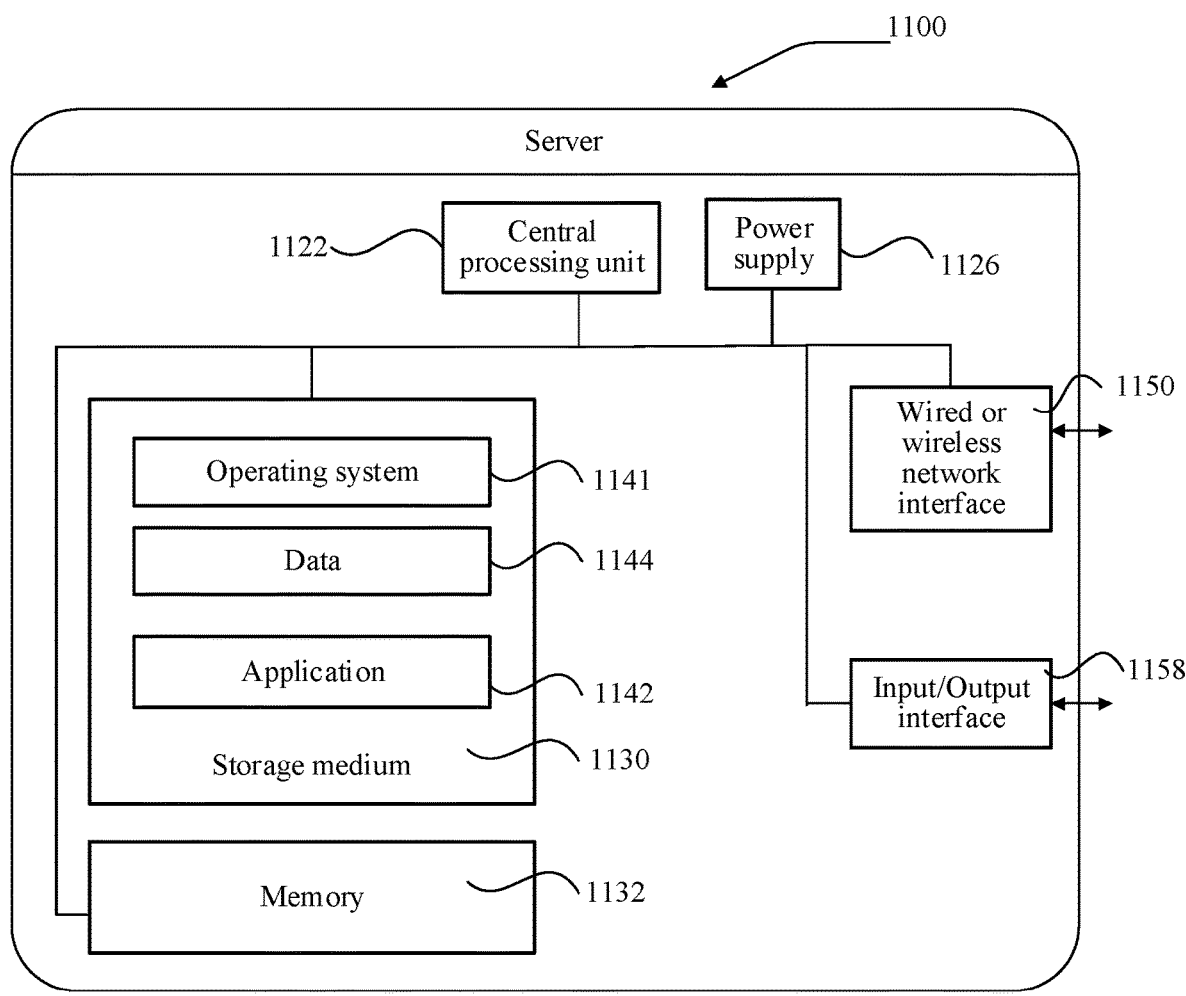
FIG. 12 is a schematic structural diagram of composition of a block processing method being applied to a server according to an embodiment of this disclosure.

FIG. 12 is a schematic structural diagram of a server according to an embodiment of this disclosure. The server may be specifically the first node in the foregoing blockchain to implement the block processing method on a first node side, or may be the second node in the blockchain to implement the block processing method on a second node side. A server 1100 may greatly vary due to different configurations or performances, and may include one or more central processing units (CPUs) 1122 (for example, one or more processors), a memory 1132, and one or more storage media 1130 (for example, one or more mass storage devices) for storing application programs 1142 or data 1144. The memory 1132 and the storage medium 1130 may be transient or persistent storages. The program stored in the storage medium 1130 may include one or more modules (not shown), and each module may include a series of instructions and operations for the server. Further, the CPU 1122 may be set to communicate with the storage medium 1130, and perform, on the server 1100, the series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

Steps of the block processing method performed by the first node in the foregoing embodiment may be based on the server structure shown in FIG. 12. Similarly, steps of the block processing method performed by the second node in the foregoing embodiment may be based on the server structure shown in FIG. 12.

In addition, the described apparatus embodiment is merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. In addition, in the accompanying drawings of the apparatus embodiments provided by the embodiments of this disclosure, connection relationships between modules indicate that the modules have communication connections with each other, which may be specifically implemented as one or more communication buses or signal cables. A person of ordinary skill in the art may understand and implement the embodiments without creative efforts.

Based on the description of the foregoing implementations, a person skilled in the art may clearly understand that the embodiments of this disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit. However, for the embodiments of this disclosure, software program implementation is a better implementation in most cases. Based on such an understanding, the technical solutions of the embodiments of this disclosure essentially or the part contributing to the existing technology may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this disclosure.

In an exemplary embodiment, a computer program product is further provided, when executed on a first node, the computer program product being configured to implement the block processing method on the first node side; and when executed on a second node, the computer program product being configured to implement the block processing method on the second node side.

To sum up, the foregoing embodiments are merely intended for describing the technical solutions of the embodiments of this disclosure, but not for limiting this application. Although the embodiments of this disclosure is described in detail with reference to the foregoing embodiments, it is to be understood by a person of ordinary skill in the art that modifications can still be made to the technical solutions described in the foregoing embodiments or equivalent replacements may be made to some technical features thereof, without departing from the spirit and scope of the technical solutions of the embodiments of this disclosure.

What is claimed is:

1. A method for block processing in a blockchain, comprising:
   determining, by a first node in the blockchain, whether a transaction queue meets a preset block generation condition;
   in response to the transaction queue meeting the block generation condition, packaging, by the first node, first transaction information in the transaction queue of the first node into a candidate block, and broadcasting the candidate block through the blockchain;
   performing, by the first node, verification on the first transaction information in the candidate block to generate a first verification result, and executing the first transaction information in the candidate block to generate a first transaction execution result;
   broadcasting, by the first node, a first node processing result comprising the first verification result and the first transaction execution result through the blockchain;
   receiving, by the first node, a second node processing result broadcast by a second node in the blockchain through the blockchain, the second node processing result comprising: a second verification result generated by the second node by performing verification on the first transaction information in the candidate block, and a second transaction execution result generated by executing the first transaction information in the candidate block by the second node; and
   performing, by the first node, consensus on the candidate block according to the first node processing result and the second node processing result, saving, by the first node, the candidate block in response to a consensus on the candidate block being reached successfully, and saving, by the first node, the first transaction execution result in response to the first transaction information being executed successfully.

2. The method according to claim 1, wherein determining whether the transaction queue meets the preset block generation condition comprises:
   checking, by the first node, whether a quantity of pieces of transaction information stored in the transaction queue exceeds a first threshold; and
   determining, in response to the quantity of pieces of transaction information exceeding the first threshold, that the transaction queue meets the block generation condition.

3. The method according to claim 1, wherein determining whether the transaction queue meets the preset block generation condition comprises:
   checking, by the first node, whether a volume of data stored in the transaction queue exceeds a second threshold; and
   determining, by the first node in response to the volume of data exceeding the second threshold, that the transaction queue meets the block generation condition.

4. The method according to claim 1, wherein determining whether the transaction queue meets the preset block generation condition comprises:
   checking, by the first node, whether a time difference between a previous block generation time of the transaction queue and a current time exceeds a block generation time threshold; and
   determining, by the first node in response to the time difference exceeding the block generation time threshold, that the transaction queue meets the block generation condition.

5. The method according to claim 1, further comprising:
receiving, by the first node, transaction information transmitted by at least one client to the blockchain; or receiving, by the first node, transaction information obtained by the second node from at least one client; and
adding the transaction information of the at least one client into the transaction queue.

6. The method according to claim 1, further comprising:
packaging, by the first node, second transaction information in the transaction queue into the candidate block in response to the first transaction information being packaged into the candidate block, and broadcasting the candidate block through the blockchain;
performing, by the first node, verification on the second transaction information in the candidate block to generate a third verification result, and executing the second transaction information in the candidate block to generate a third transaction execution result;
broadcasting, by the first node, a third node processing result comprising the third verification result and the third transaction execution result through the blockchain comprising: the third verification result and the third transaction execution result;
receiving, by the first node, a fourth node processing result broadcast by the second node through the blockchain, the fourth node processing result comprising: a fourth verification result generated by the second node by performing verification on the second transaction information in the candidate block, and a fourth transaction execution result generated by executing the second transaction information in the candidate block by the second node; and
performing, by the first node, consensus on the candidate block according to the third node processing result and the fourth node processing result, saving the candidate block in response to a consensus on the candidate block being reached successfully, and saving the third transaction execution result in response to the second transaction information being executed successfully.

7. The method according to claim 1, wherein saving the candidate block in response to the consensus on the candidate block being reached successfully comprises:
saving, by the first node, header information of the candidate block in response to the consensus on the candidate block being reached successfully, and saving the first transaction information that is successfully verified.

8. The method according to claim 1, further comprising:
receiving, by the second node, the candidate block broadcast by the first node through the blockchain, and obtaining the first transaction information from the candidate block;
performing, by the second node, verification on the first transaction information in the candidate block to generate the second verification result, and executing the first transaction information in the candidate block to generate the second transaction execution result;
broadcasting, by the second node, the second node processing result comprising the second verification result and the second transaction execution result through the blockchain; and
saving, by the second node, the candidate block when the first transaction information is verified successfully, and saving the second transaction execution result when the first transaction information is executed successfully.

9. The method according to claim 8, wherein after broadcasting the second node processing result through the blockchain, the method further comprises:
receiving, by the second node, the first node processing result broadcast by the first node through the blockchain; and
performing, by the second node, the consensus on the candidate block according to the first node processing result and the second node processing result, and in response to the consensus on the candidate block being reached successfully, saving, by the second node, the candidate block when the first transaction information is verified successfully, and saving, by the second node, the second transaction execution result when the first transaction information is executed successfully.

10. The method according to claim 8, wherein after the broadcasting, by the second node, the second node processing result through the blockchain, the method further comprises:
receiving, by the second node, a notification message transmitted by the first node when consensus on the candidate block is reached successfully; and
in response to receiving the notification message, saving, by the second node, the candidate block when the first transaction information is verified successfully, and saving the second transaction execution result when the first transaction information is executed successfully.

11. The method according to claim 8, further comprising:
receiving by the second node, the candidate block broadcast by the first node through the blockchain, and obtaining second transaction information from the candidate block;
performing, by the second node, verification on the second transaction information in the candidate block to generate a fourth verification result, and executing the second transaction information in the candidate block to generate a fourth transaction execution result;
broadcasting, by the second node, a fourth node processing result comprising the fourth verification result and the fourth transaction execution result through the blockchain; and
in response to the second transaction information being verified successfully, saving the candidate block by the second node, and in response to the second transaction information being executed successfully, saving the fourth transaction execution result by the second node.

12. A method for block processing in a blockchain, comprising:
adding, by a first node in the blockchain, transaction information transmitted by a client into a transaction queue of the first node;
determining, by the first node, whether the transaction queue meets a preset block generation condition;
packaging, by the first node in response to the transaction queue meeting the block generation condition, first transaction information in the transaction queue of the first node into a candidate block, adding a signature to the candidate block, and broadcasting the candidate block through the blockchain;
performing, by the first node, verification on the first transaction information in the candidate block to generate a first verification result, and executing the first transaction information in the candidate block to generate a first transaction execution result;
adding, by the first node, a signature to a first node processing result, and then broadcasting the first node processing result through the blockchain, the first node processing result comprising: the first verification result and the first transaction execution result;

receiving, by the first node through the blockchain, a second node processing result broadcast by a second node in the blockchain, the second node processing result comprising: a second verification result generated by the second node by performing verification on the first transaction information in the candidate block, and a second transaction execution result generated by executing the first transaction information in the candidate block by the second node; and performing, by the first node according to the first node processing result and the second node processing result, consensus on the candidate block by using a distributed consensus algorithm, then saving, by the first node, the candidate block when a consensus on the candidate block is reached successfully, and saving, by the first node, the first transaction execution result if the first transaction information is executed successfully.

13. The method according to claim 12, further comprising:

packaging, by the first node, second transaction information in the transaction queue into the candidate block in response to the first transaction information being packaged into the candidate block, adding a signature to the candidate block, and then broadcasting the candidate block through the blockchain;

performing, by the first node, verification on the second transaction information in the candidate block to generate a third verification result, and executing the second transaction information in the candidate block to generate a third transaction execution result;

adding, by the first node, a signature to a third node processing result, and then broadcasting the third node processing result through the blockchain, the third node processing result comprising: the third verification result and the third transaction execution result;

receiving, by the first node, a fourth node processing result broadcast by the second node through the blockchain, the fourth node processing result comprising: a fourth verification result generated by the second node by performing verification on the second transaction information in the candidate block, and a fourth transaction execution result generated by executing the second transaction information in the candidate block by the second node; and performing, by the first node, consensus on the candidate block according to the third node processing result and the fourth node processing result, then saving, by the first node, the candidate block in response to a consensus on the candidate block being reached successfully, and saving the third transaction execution result in response to the second transaction information being executed successfully.

14. The method according to claim 12, wherein saving, by the first node, the candidate block in response to the consensus on the candidate block being reached successfully comprises:

saving, by the first node, header information of the candidate block in response to the consensus on the candidate block being reached successfully, and saving the first transaction information that is successfully verified, the header information of the candidate block comprising: a hash value, a root of Merkle tree, a root of state, a receipt root, a signature of node, and a nonce of a previous block of the candidate block.

15. The method according to claim 12, further comprising:

receiving, by the second node, a candidate block broadcast by the first node through the blockchain, and obtaining first transaction information from the candidate block;

performing, by the second node, the verification on the first transaction information in the candidate block to generate the second verification result, and executing the first transaction information in the candidate block to generate the second transaction execution result;

adding, by the second node, a signature to a second node processing result, and broadcasting the second node processing result through the blockchain, the second node processing result comprising: the second verification result and the second transaction execution result; and saving, by the second node, the candidate block in response to the first transaction information being verified successfully, and saving, by the second node, the second transaction execution result in response to the first transaction information being executed successfully.

16. A system, comprising a first node in a blockchain, the first node comprising a first memory for storing first instructions and a first processor in communication with the first memory and configured to execute the first instructions to cause the first node to:

determine whether a transaction queue meets a preset block generation condition in response to the transaction queue meeting the block generation condition, package first transaction information in the transaction queue of the first node into a candidate block, and broadcast the candidate block through the blockchain;

perform verification on the first transaction information in the candidate block to generate a first verification result, and execute the first transaction information in the candidate block to generate a first transaction execution result;

broadcast a first node processing result comprising the first verification result and the first transaction execution result through the blockchain;

receive, through the blockchain, a second node processing result broadcast by a second node in the blockchain, the second node processing result comprising: a second verification result generated by the second node by performing verification on the first transaction information in the candidate block, and a second transaction execution result generated by executing the first transaction information in the candidate block by the second node; and perform consensus on the candidate block according to the first node processing result and the second node processing result, saving, by the first node, the candidate block in response to a consensus on the candidate block being reached successfully, and save the first transaction execution result in response to the first transaction information being executed successfully.

17. The system of claim 16, further comprising the second node of the blockchain, the second node comprising a second memory for storing second instructions and a second processor in communication with the second memory and configured to execute the second instructions to cause the second node to:

receive the candidate block broadcast by the first node through the blockchain, and obtain the first transaction information from the candidate block;

perform verification on the first transaction information in the candidate block to generate the second verification result, and execute the first transaction information in the candidate block to generate the second transaction execution result;

broadcast the second node processing result comprising the second verification result and the second transaction execution result through the blockchain; and save the candidate block when the first transaction information is verified successfully, and save the second transaction execution result when the first transaction information is executed successfully.

18. The system of claim 16, wherein the first processor is configured to execute the first instructions to further cause the first node to:

receive transaction information transmitted by at least one client to the blockchain; or transaction information obtained by the second node from at least one client; and add the transaction information of the at least one client into the transaction queue.

19. The system of claim 16, wherein, when the first processor is configured to execute the first instructions to cause the first node to determine whether the transaction queue meets the preset block generation condition, the first processor is configured to execute the first instructions to cause the first node to:

check whether a quantity of pieces of transaction information stored in the transaction queue exceeds a first threshold; and determine, in response to the quantity of pieces of transaction information exceeding the first threshold, that the transaction queue meets the block generation condition.

20. The system of claim 16, wherein, when the first processor is configured to execute the first instructions to cause the first node to determine whether the transaction queue meets the preset block generation condition, the first processor is configured to execute the first instructions to cause the first node to:

check whether a volume of data stored in the transaction queue exceeds a second threshold; and determine, in response to the volume of data exceeding the second threshold, that the transaction queue meets the block generation condition.

\* \* \* \* \*